(12) United States Patent
Kulal

(10) Patent No.: US 9,629,033 B2
(45) Date of Patent: Apr. 18, 2017

(54) SYSTEM AND METHOD TO FACILITATE SERVICE HAND-OUTS USING USER EQUIPMENT GROUPS IN A NETWORK ENVIRONMENT

(71) Applicant: CISCO TECHNOLOGY, INC., San Jose, CA (US)

(72) Inventor: Sushanth Chandappa Kulal, Mangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 125 days.

(21) Appl. No.: 14/741,266

(22) Filed: Jun. 16, 2015

(65) Prior Publication Data

US 2016/0373970 A1    Dec. 22, 2016

(51) Int. Cl.
*H04W 4/08* (2009.01)
*H04W 36/00* (2009.01)
(Continued)

(52) U.S. Cl.
CPC ......... *H04W 36/0016* (2013.01); *H04W 4/08* (2013.01); *H04W 8/005* (2013.01);
(Continued)

(58) Field of Classification Search
CPC ...... H04W 8/186; H04W 36/04; H04W 88/04
See application file for complete search history.

(56) References Cited

U.S. PATENT DOCUMENTS 9,185,530 B2 * 11/2015 Gomes .................. H04W 8/186
2012/0083221 A1    4/2012 Ranta-Aho et al.
(Continued)

FOREIGN PATENT DOCUMENTS

EP         2787764       10/2014
WO    WO2014/063747      5/2014
(Continued)

OTHER PUBLICATIONS

U.S. Appl. No. 14/749,014, filed Jun. 24, 2015, entitled "System and Method to Facilitate Service Hand-Outs Using User Equipment Groups in a Network Environment," Inventor: Sushanth Chandappa Kulal.
(Continued)

*Primary Examiner* — Charles Appiah
*Assistant Examiner* — Randy Peaches
(74) *Attorney, Agent, or Firm* — Patent Capital Group

(57) ABSTRACT

An example method is provided in one example embodiment and may include grouping a plurality of user equipment served by a serving cell radio into one or more groups based on an approximate location of each of the plurality of user equipment and a proximity of each of the plurality of user equipment in relation to each other; selecting a master user equipment for each group; receiving inter-frequency measurement information or inter-Radio Access Technology (RAT) measurement information associated with one or more neighboring cell radios; receiving a first service request for a first user equipment of a particular group; and selecting a particular neighboring cell radio for a service hand-out of the first user equipment based, at least in part, on the first service request and inter-frequency measurement information or inter-RAT measurement information received from a particular master user equipment for the particular group.

20 Claims, 14 Drawing Sheets

(51) Int. Cl.
  *H04W 64/00* (2009.01)
  *H04W 8/00* (2009.01)
  *H04W 84/18* (2009.01)

(52) U.S. Cl.
  CPC ... *H04W 36/0061* (2013.01); *H04W 36/0088* (2013.01); *H04W 64/00* (2013.01); *H04W 84/18* (2013.01)

(56) References Cited

U.S. PATENT DOCUMENTS

2014/0113636 A1  4/2014  Lee et al.
2014/0199992 A1  7/2014  Chincholi et al.

FOREIGN PATENT DOCUMENTS

WO  WO2014/081354  5/2014
WO  WO2014/124689  8/2014

OTHER PUBLICATIONS

ETSI TS 134 121 V6.4.0 (Mar. 2006) Technical Specification: "Universal Mobile Telecommunications System (UMTS); Terminal conformance specification, Radio transmission and reception (FDD) (3GPP TS 34.121 version 6.4.0 Release 6);" ETSI, 650 Route des Lucioles, F-06921, Sophia Antipolis Cedex—France, Mar. 2006; 22 pages.

ETSI TS 136 211 V12.4.0 (Feb. 2015) Technical Specification: "LTE; Evolved Universal Terrestrial Radio Access (E-UTRA); Physical channels and modulation (3GPP TS 36.211 version 12.4.0 Release 12);" ETSI, 650 Route des Lucioles, F-06921, Sophia Antipolis Cedex—France, Feb. 2015; 126 pages.

3GPP, A Global Initiative, Analysis of NGMN Requirements REQ 4: LTE Automatic Neighbor Relation (ANR) and Self Organizing Networks (SON) Operation; Jan. 18, 2011; 10 pages.

"Block Error Ratio (BLER) Measurement Description," Keysight Technology Discussion Forum, Feb. 14, 2014; 3 pages; http://rfmw.em.keysight.com/rfcomms/refdocs/wcdma/wcdma_meas_wblerror_desc.html.

Cisco Systems, Inc., "RADIUS Vendor-Specific Attributes (VSA)," Cisco IOS Security Configuration Guide, published on or about Feb. 18, 2014, pp. 493-502.

Telecom Insights, "UMTS UTRAN Block Error Rate (BLER) Measurements," Jan. 2011; 26 pages; http://friends-in-telecoms.blogspot.com/2011_01_01_archives.html.

"VoLTE," from Wikipedia, the free encyclopedia; Apr. 12, 2015, 10 pages.

EPO Oct. 18, 2016 European Search Report from European Application No. 16156566.8; 8 pages.

* cited by examiner

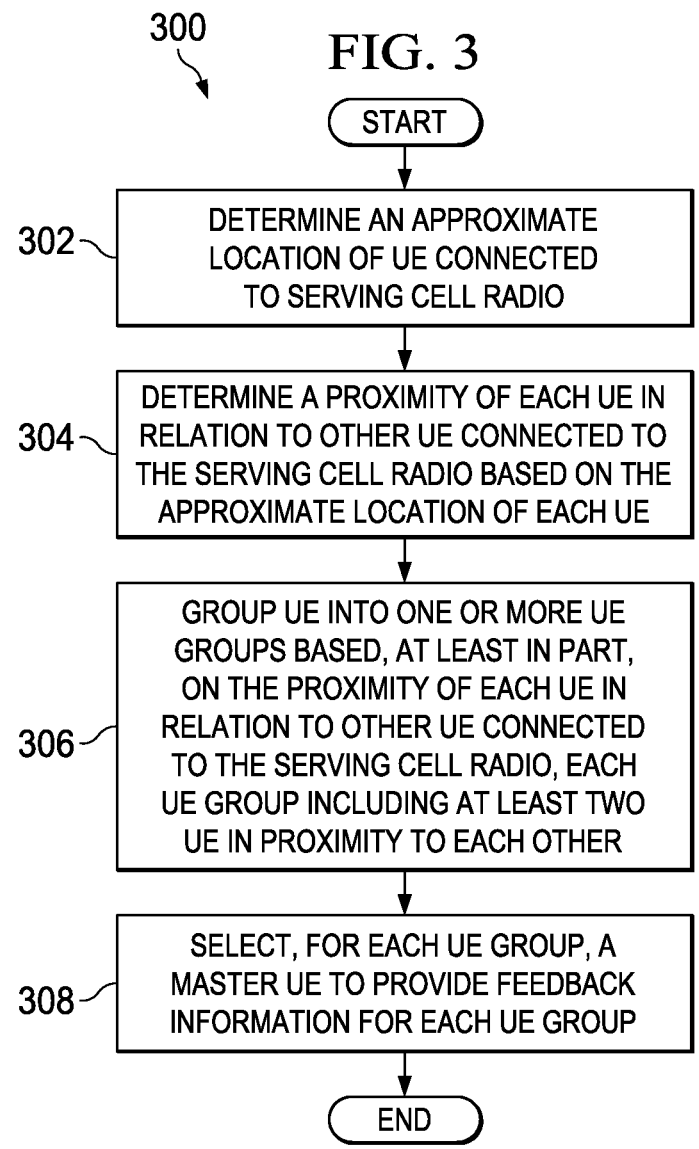

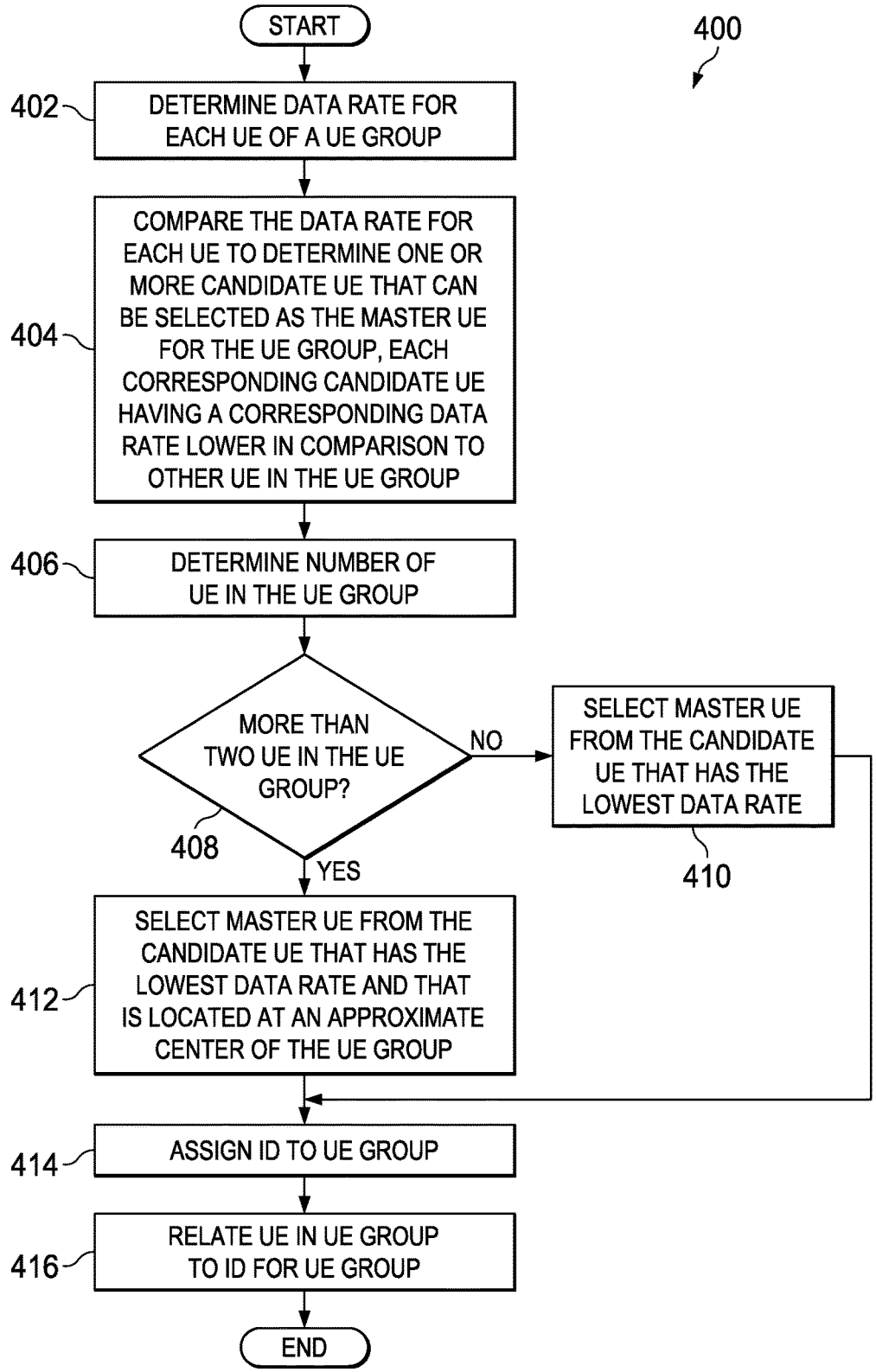

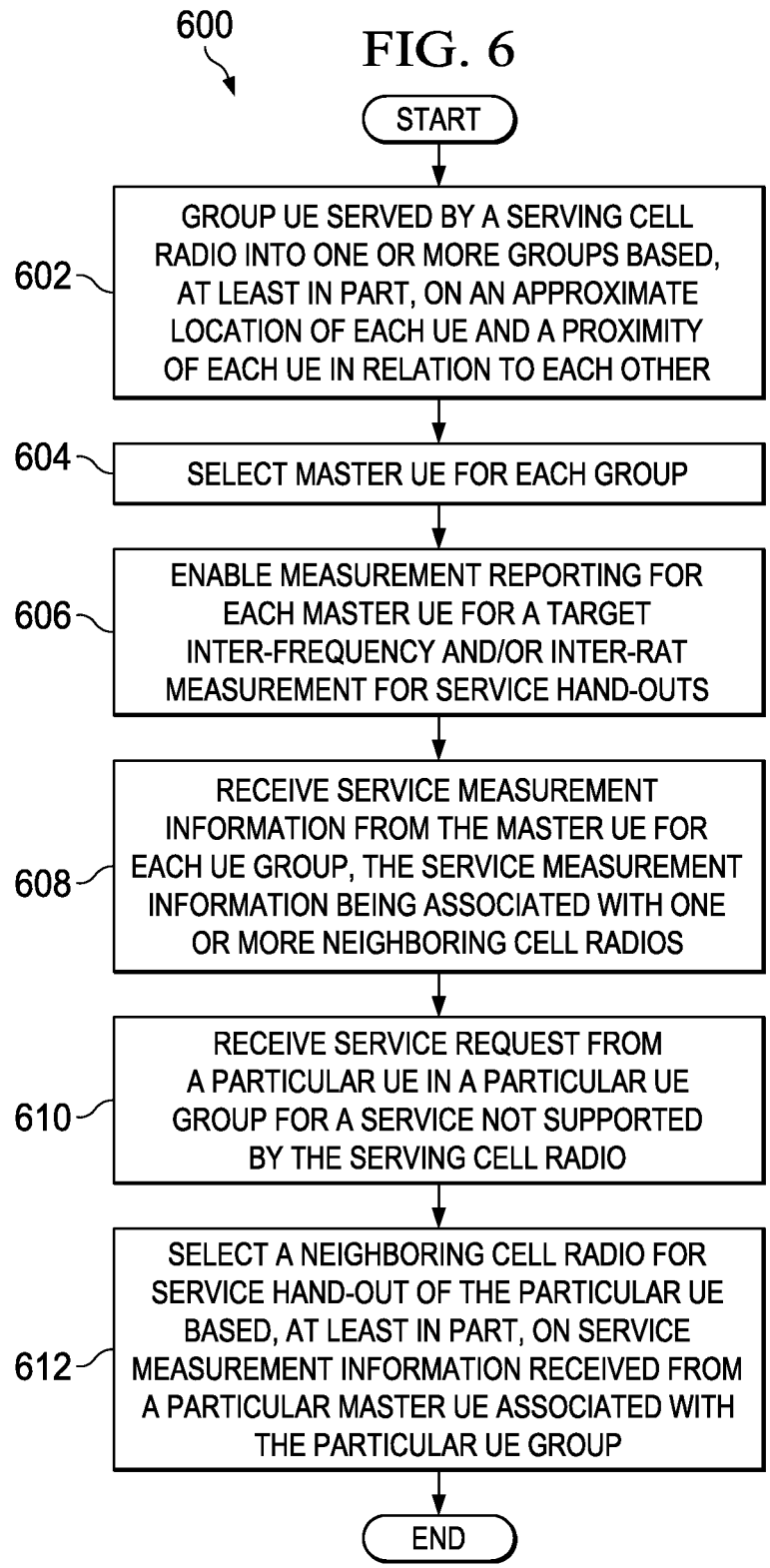

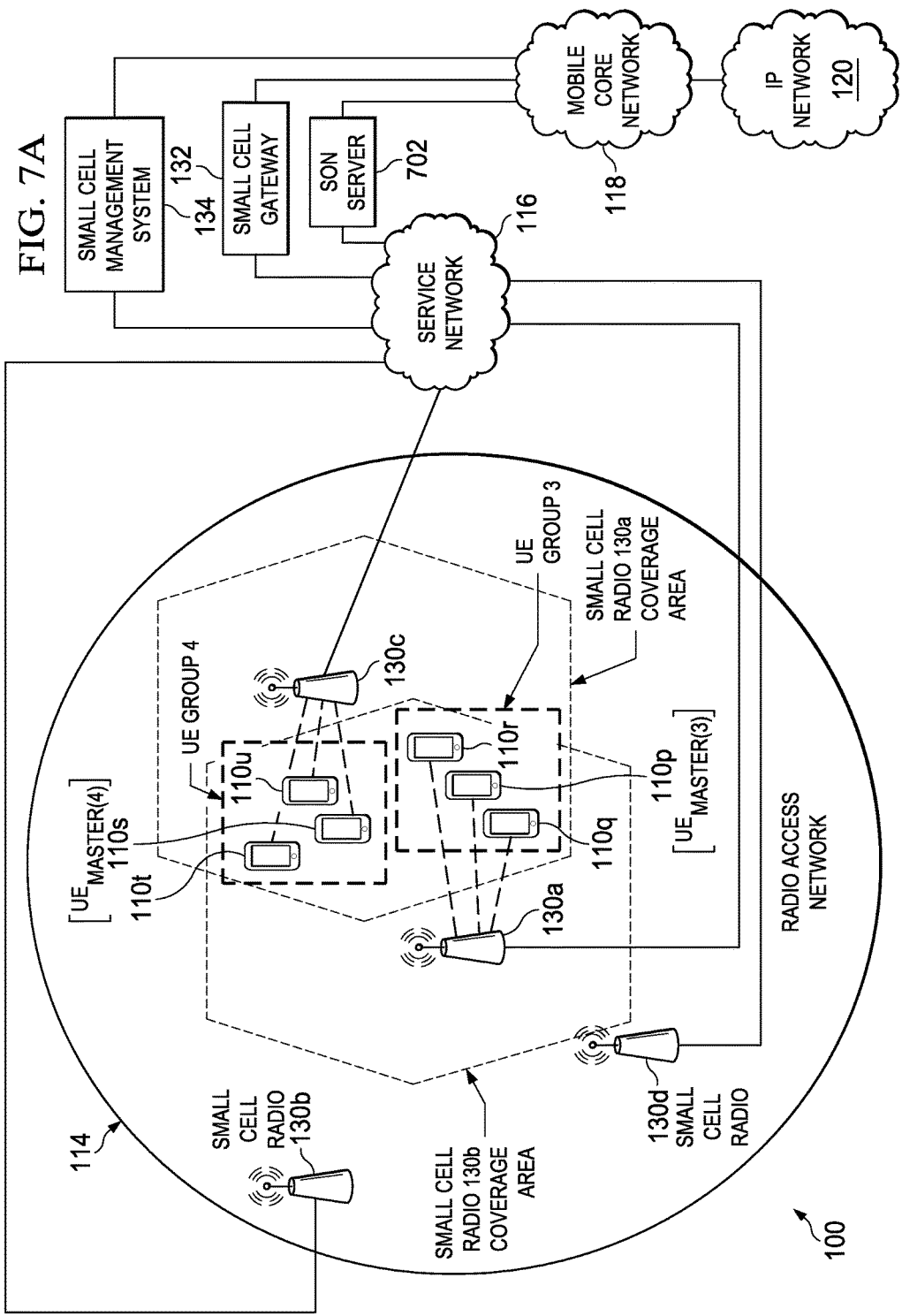

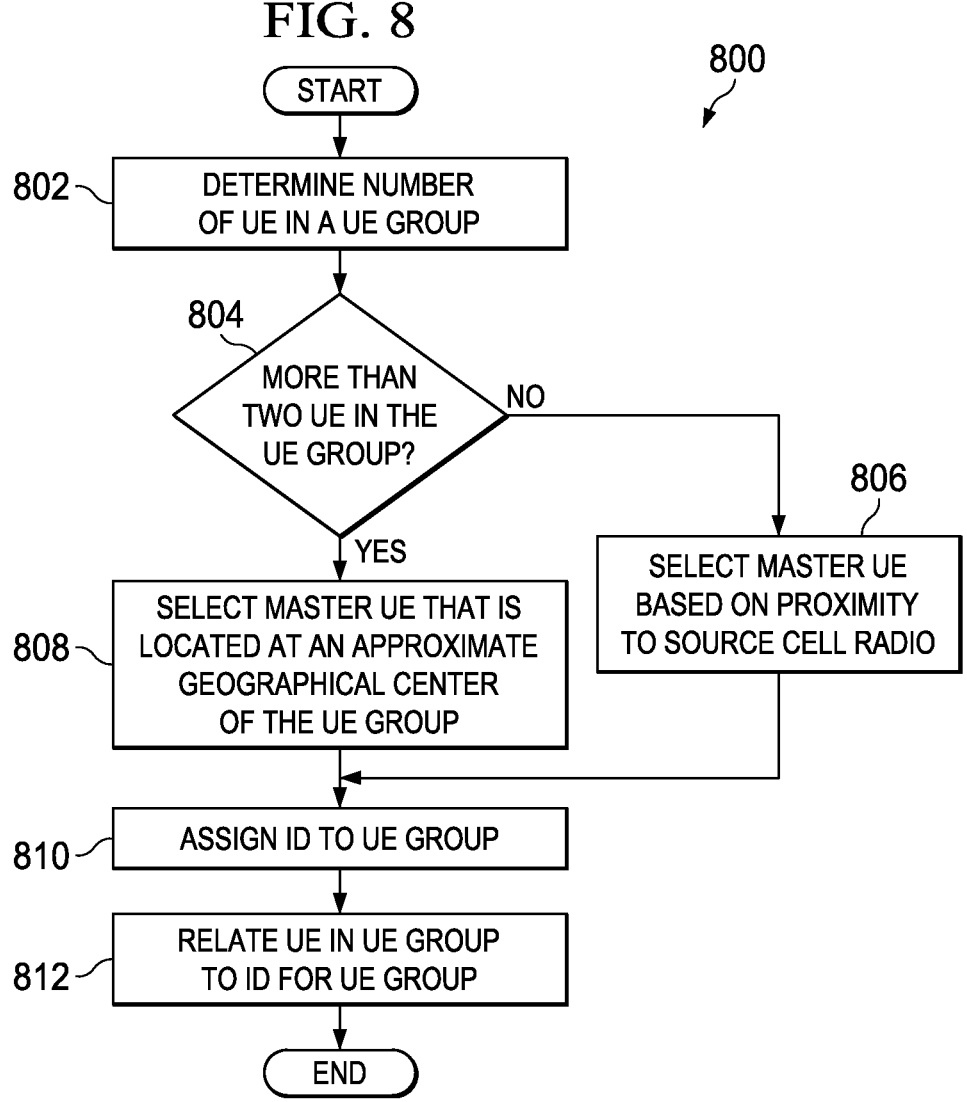

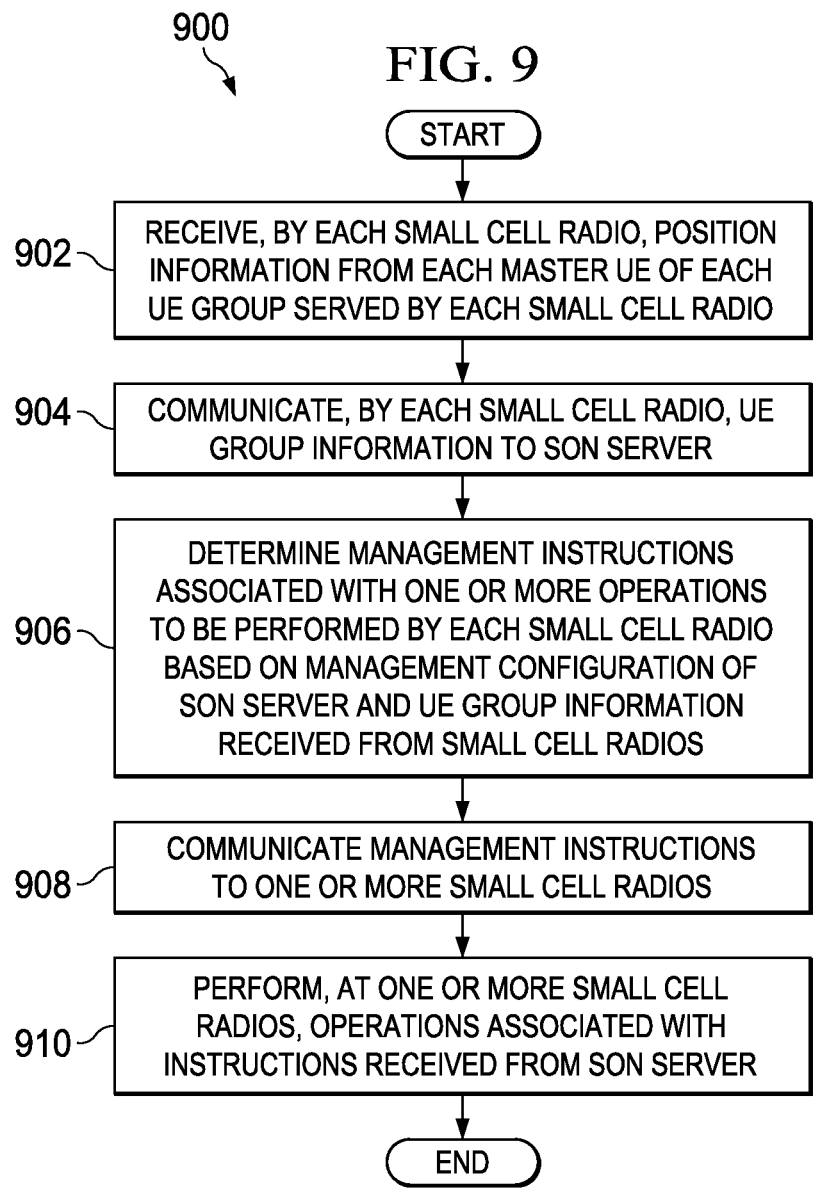

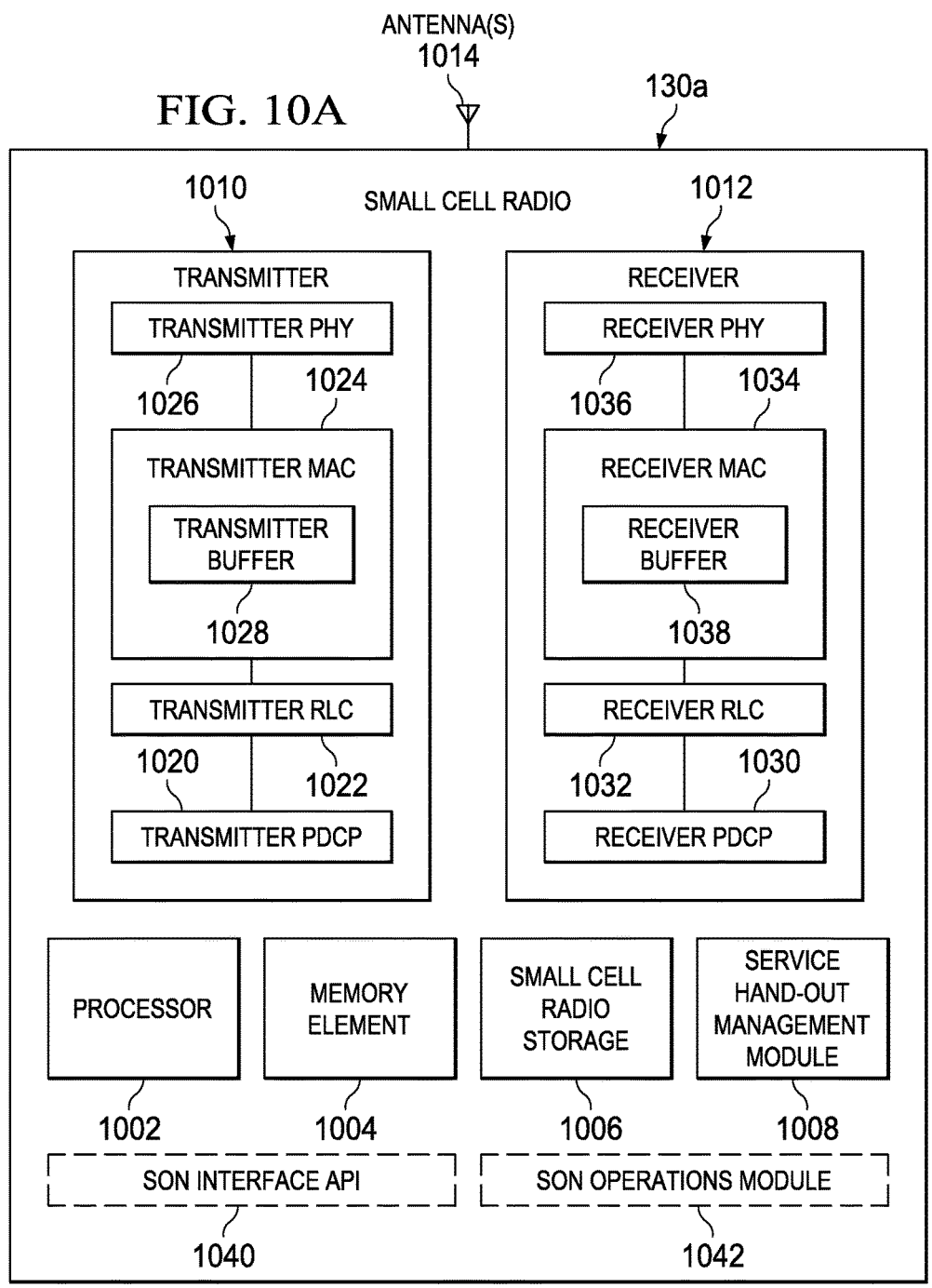

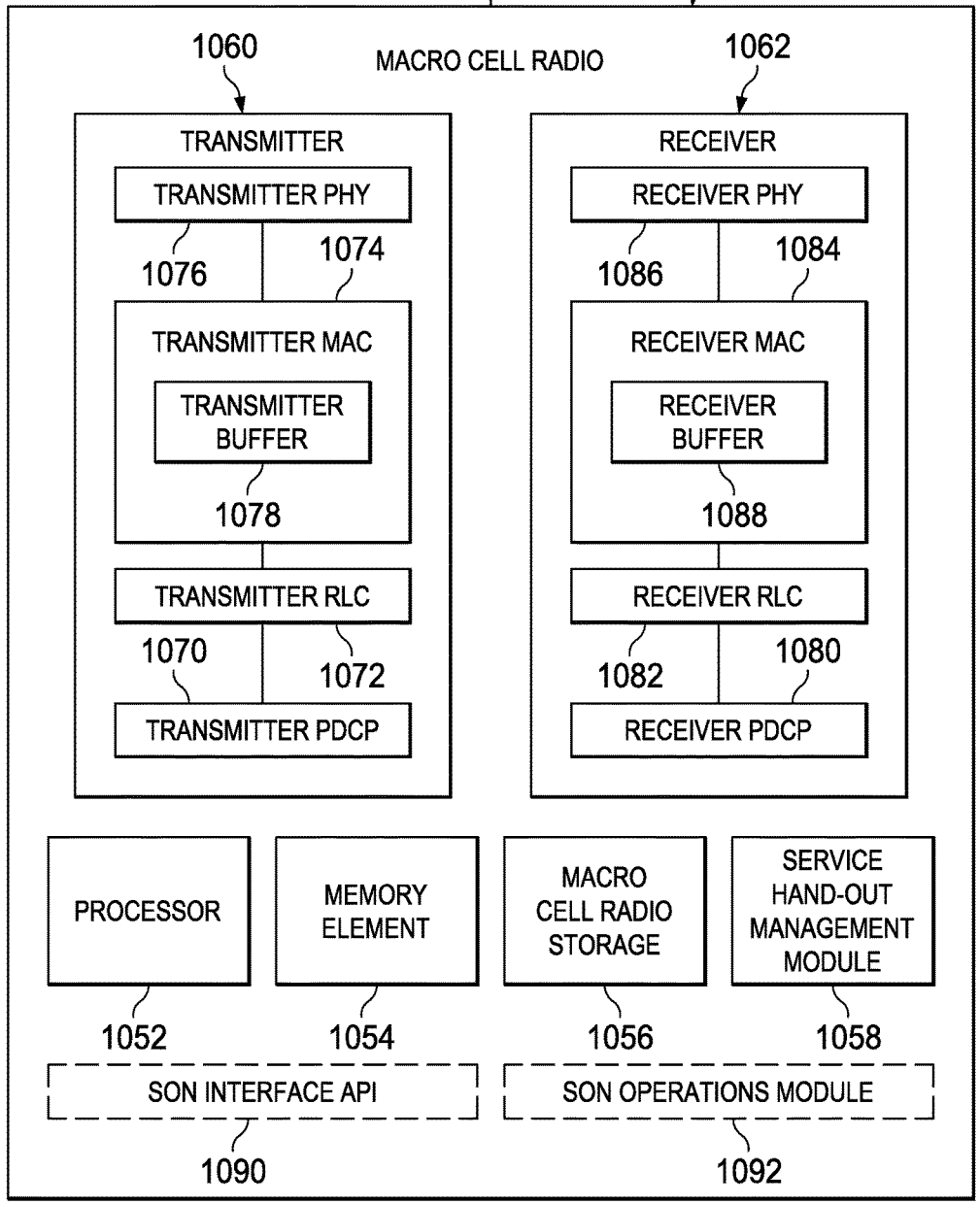

US 9,629,033 B2

SYSTEM AND METHOD TO FACILITATE SERVICE HAND-OUTS USING USER EQUIPMENT GROUPS IN A NETWORK ENVIRONMENT

TECHNICAL FIELD

This disclosure relates in general to the field of communications and, more particularly, to a system and method to facilitate service hand-outs using user equipment (UE) groups in a network environment.

BACKGROUND

Networking architectures have grown increasingly complex in communication environments. For example, small cell radios have gained notoriety due to their capabilities to connect wireless devices to a network. In general terms, small cell radios can operate in a licensed spectrum to connect user equipment to the network, often using broadband connections. For a mobile operator, small cell radios can offer improvements to both coverage and capacity, which is particularly applicable to indoor networking environments where macro cell radio networks typically suffer coverage limitations. In some cases, a service hand-out may be needed from a serving cell radio does not support a service requested by a user equipment to a cell radio that supports the service. In some service hand-outs, delays occur during the time that a service hand-out target is determined for a given user equipment requesting a particular service. Such delays can cause service hand-out failures, which can degrade network performance as well as user experience. Accordingly, there are significant challenges in managing service hand-outs for user equipment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flow diagram illustrating example operations associated with grouping user equipment into one or more user equipment groups in accordance with one potential embodiment of the communication system;

FIG. 4 is a simplified flow diagram illustrating example operations associated with selecting a master user equipment for a user equipment group in accordance with one potential embodiment of the communication system;

FIG. 6 is a simplified flow diagram illustrating example operations associated with facilitating service hand-outs for user equipment using user equipment groups in accordance with one potential embodiment of the communication system;

FIGS. 7A-7B are simplified block diagrams illustrating additional details associated with one potential embodiment of the communication system;

FIG. 8 is a simplified flow diagram illustrating other example operations associated with master user equipment selection for a user equipment group in accordance with one potential embodiment of the communication system;

FIG. 9 is a simplified flow diagram illustrating example operations associated with a Self-Organizing Network (SON) server in accordance with one potential embodiment of the communication system; and FIGS. 10A-10C are simplified block diagrams illustrating additional details associated with various potential embodiments of the communication system.

DETAILED DESCRIPTION OF EXAMPLE EMBODIMENTS

Overview

Figure 1A:
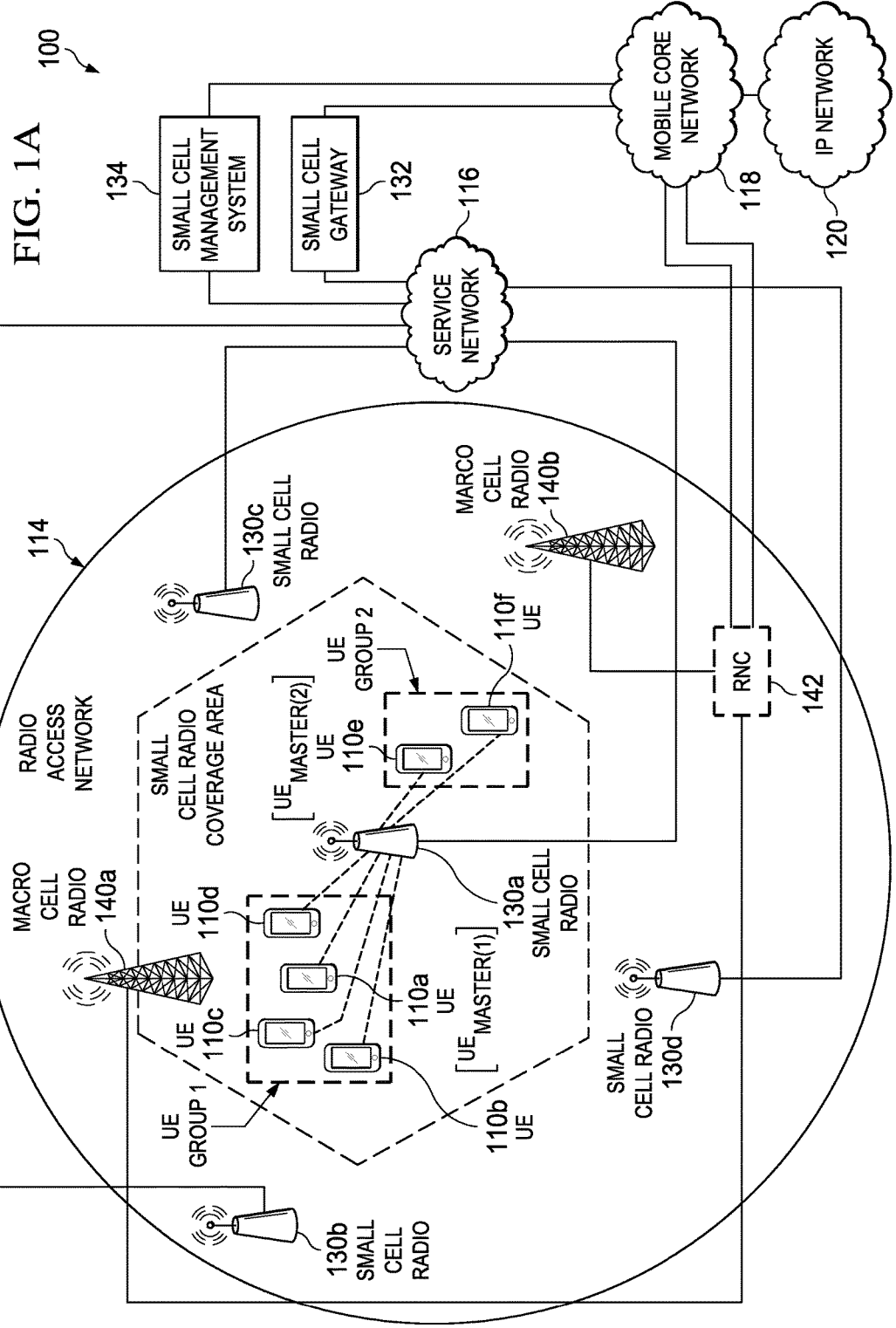
FIG. 1A is a simplified block diagram illustrating a communication system to facilitate service hand-outs for user equipment using user equipment groups according to one embodiment of the present disclosure.

A method is provided in one example embodiment and may include grouping a plurality of user equipment served by a serving cell radio into one or more groups based on an approximate location of each of the plurality of user equipment and a proximity of each of the plurality of user equipment in relation to each other, the serving cell radio providing a first service to the plurality of user equipment; selecting a master user equipment for each group; receiving, from the master user equipment for each group, inter-frequency measurement information or inter-Radio Access Technology (RAT) measurement information associated with one or more neighboring cell radios; receiving a first service request for a first user equipment of a particular group, wherein the first service request includes a request for a second service for the first user equipment and wherein the second service is not provided by the serving cell radio; and selecting a particular neighboring cell radio for a service hand-out of the first user equipment based, at least in part, on the first service request and inter-frequency measurement information or inter-RAT measurement information received from a particular master user equipment for the particular group.

In some instances, grouping the plurality of user equipment served by the serving cell radio into one or more groups can further include: enabling intra-frequency measurement reporting for each user equipment served by the serving cell radio; triangulating the approximate location of each of the plurality of user equipment based on intra-frequency measurement information received from each of the plurality of user equipment for at least two intra-frequency neighboring cell radios of each of the plurality of user equipment served by the serving cell radio; and determining the proximity of each of the user equipment in relation to each other for grouping at least two user equipment in close proximity to each other into a group.

In some cases, the method can include adjusting a size of a particular group of user equipment based on inter-frequency measurement information or inter-RAT measurement information received for a particular master user equipment for the particular group, wherein the adjusting includes. In some instances, the adjusting can include: increasing the size of the particular group if the inter-frequency measurement information or the inter-RAT measurement information indicates a strong neighboring cell radio; and decreasing the size of the particular group if the inter-frequency measurement information or the inter-RAT measurement information indicates a weak neighboring cell radio.

In some instances, selecting a particular master user equipment for a particular group can further include determining a data rate for each user equipment for the particular group based on at least one of: evaluating a number of quality of service (QoS) class identifiers (QCIs) for each user equipment, wherein the number of QCIs for each user equipment is associated with the data rate for each user equipment; and determining the data rate for each user equipment based on an assessment of one or more protocol layers of the serving cell radio. In other instances, selecting the particular master user equipment for the particular group can further include comparing the data rate for each user equipment for the particular group to determine one or more candidate user equipment that can be selected as the particular master user equipment, wherein the one or more candidate user equipment have lower data rates in comparison to other user equipment of the particular group; and selecting the particular master user equipment from the one or more candidate user equipment, which has the lowest data rate.

In yet other instances selecting the particular master user equipment for the particular group can further include selecting the master user equipment from the candidate user equipment, which has the lowest data rate and that is located at an approximate center of the particular group. In still other instances, selecting a particular master user equipment for a particular group can further include evaluating a modulation and coding scheme (MCS) order for each user equipment for the particular group to determine one or more candidate user equipment that can be selected as the master user equipment, wherein the MCS is associated with a communication channel condition between the serving cell radio and each user equipment for the particular group; and selecting the particular master user equipment from the one or more candidate user equipment, which has the highest order MCS. In still other instances, selecting the particular master user equipment for the particular group can further include selecting the master user equipment from the one or more candidate user equipment, which has the highest order MCS and that is located at an approximate center of the particular group.

Another method is provided in another example embodiment and may include receiving, by a serving cell radio, feedback information for a master user equipment of a user equipment group, wherein the feedback information includes position information associated one or more neighboring cell radios; communicating, at least in part, the feedback information, a size of the user equipment group and an identifier for the user equipment group to a Self-Organizing Network (SON) server; determining, by the SON server, management instructions associated with one or more operations to performed by the serving cell radio; communicating the management instructions to the serving cell radio; and performing, by the serving cell radio, the one or more operations associated with the management instructions.

In some instances, the feedback information can include position information associated with the master user equipment which includes a cell identifier and a signal strength associated with each of the one or more neighboring cell radios. In some instances, the management instructions can be associated with one or more operations to perform coordinated resource scheduling for user equipment in the user equipment group with one or more other user equipment groups associated with one or more corresponding neighboring cell radios. In some cases, the coordinated scheduling can be performed through one or more operations including at least one of: coordinating resources with the one or more other user equipment groups via an interface connecting the serving cell radio and the one or more corresponding neighboring cell radios; and coordinating resources with the one or more other user equipment groups according to resource group allocations included in the management instructions from the SON server.

In still some instances, the management instructions can include an identifier for each of the one or more other groups. In still some instances, the management instructions can be associated with one or more operations to initiate handover of user equipment in the user equipment group to one or more neighboring cell radios. In still some instances, communications from the serving cell radio to the SON server further include one or more of: an available power headroom for the master user equipment; an average data rate served to user equipment in the user equipment group; an average uplink Signal to Interference plus Noise Ratio (SINR) for the user equipment group; and a downlink Block Error Rate (BLER) for user equipment in the user equipment group.

In some cases, the other method can further include selecting the master user equipment for the user equipment group based on one of: its location being at an approximate geographical center of the user equipment group if there are more than two user equipment in the user equipment group; and its location being closest to the serving cell radio if there are only two user equipment in the user equipment group.

Example Embodiments

Turning to FIG. 1A, FIG. 1A is a simplified block diagram illustrating a communication system 100 to facilitate service hand-outs in a network environment according to one embodiment of the present disclosure. This particular configuration may be tied to the 3rd Generation Partnership Project (3GPP) architecture for the Evolved Packet System (EPS) architecture, also sometimes referred to as the Long Term Evolution (LTE) EPS architecture. Alternatively, the depicted architecture may be applicable to other environments equally.

The example architecture of FIG. 1A may include users operating user equipment (UE) 110a-110f, a radio access network (RAN) 114, a service network 116, a mobile core network 118 and an Internet protocol (IP) network 120. RAN 114 can include one or more small cell radio(s) 130a-130d and one or more macro cell radio(s) 140a-140b. Each small cell radio 130a-130d can have a logical connection to a small cell gateway 132 and a small cell management system 134 via service network 116. Each macro cell radio 140a-140b may have a logical connection to mobile core network 118. Mobile core network 118 can be connected to IP network 120 via one or more logical connections. Each UE 110a-110f may be connected, via over-the-air communications, with small cell radio 130a, which may provide one or more services to each UE 110a-110f.

Note that small cell radios 130a-130d, small cell gateway 132 and small cell management system 134 can collectively be referred to interchangeably herein as a 'small cell layer', a 'small cell system' or a 'small cell network'. Note further that macro cell radios 140a-140b can collectively be referred to herein as a 'macro cell layer', 'a macro layer', a 'macro cell network' or a 'macro network'. As referred to herein in this Specification the terms 'cell radio' and 'cell' can be used interchangeably.

Each of the elements of FIG. 1A may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

RAN 114 may provide a communications interface between UE 110a-110f, service network 116 and mobile core network 118 via small cell radios 130a-130d and/or macro cell radios 140a-140b. In various embodiments, RAN 114 may include 3GPP access networks such as, for example, Global System for Mobile Communications (GSM) Enhanced Data Rates for GSM Evolution (EDGE) Radio Access Network (GERAN), generally referred to as 2G, Universal Mobile Telecommunications System (UMTS) Terrestrial Radio Access Network (UTRAN), generally referred to as 3G, and/or evolved UTRAN (E-UTRAN), generally referred to as 4G, Long Term Evolution (LTE) or LTE-Advanced (LTE-A). In various embodiments, RAN 114 may include non-3GPP IP access networks such as digital subscriber line (DSL), Cable, wireless local area network WLAN (e.g., Wireless Fidelity (WiFi), Worldwide Interoperability for Microwave Access (WiMAX)) or the Internet. In some embodiments, RAN 114 can be an ad-hoc network in which the number, coverage area, etc. of small cell radio(s) (e.g., small cell radio(s) 130a-130d) and/or macro cell radio(s) (e.g., macro cell radio(s) 140a-140b), can be dynamically changed (e.g., via small cell management system 134, a radio management system (RMS), a Self-Organizing Network (SON) management system, etc.) to manage capacity (e.g., load balancing) and/or services provided via small cell radios and/or macro cell radios within RAN 114.

In various embodiments, service network 116 can represent a series of points or nodes of interconnected communication paths (wired or wireless) for receiving and transmitting packets of information that propagate through communication system 100 via small cell radios 130a-130d. In various embodiments, service network 116 can be associated with and/or provided by a single network operator or service provider and/or multiple network operators or service providers. In various embodiments, service network 116 can include and/or overlap with, in whole or in part, one or more packet data networks, such as, for example, IP network 120. Service network 116 and/or IP network 120 may offer communicative interfaces between various elements of communication system 100 and may be any local area network (LAN), wireless local area network (WLAN), metropolitan area network (MAN), wide area network (WAN), virtual private network (VPN), enterprise network, Intranet, extranet, or any other appropriate architecture or system that facilitates communications in a network environment. In various embodiments, service network 116 and/or IP network 120 may implement user datagram UDP/IP connections and TCP/IP communication language protocol in particular embodiments of the present disclosure.

However, service network 116 and/or IP network 120 may alternatively implement any other suitable communication protocol for transmitting and receiving data packets within communication system 100. In various embodiments, service network 116 and/or IP network 120 can be multiple networks interconnected via one or more network appliances, nodes, elements, gateways, etc.

Mobile core network 118 may include other network appliances, nodes, elements, gateways, etc. that may make up an Evolved Packet Core (EPC) for 4G services, 2G and 3G architectures for General Packet Radio Service (GPRS), Circuit Switched (CS) services and Packet Switched (PS) services as provided in 3GPP specifications, including, for example, 3GPP Technical Specification (TS) 23.401. In various embodiments, mobile core network 118 may include network appliances, nodes, elements, gateways, etc. to provide various UE services and/or functions, such as, for example, to implement Quality-of-Service (QoS) on packet flows, to provide connectivity for UE 110a-110f to external data packet networks (PDNs) (e.g. IP network 120), to provision circuit switched (CS) voice and/or video routing (e.g., via UMTS or GSM macro cell radios), to provide enhanced services such as, for example, Voice over LTE (VoLTE), enhanced charging, stateful firewalls and/or traffic performance optimization (TPO), etc. In various embodiments, IP network 120 can include or overlap with an IP multimedia subsystem (IMS), which can facilitate packet switched (PS) VoLTE services or other enhanced IMS service for user equipment 110a-110f via mobile core network 118.

In various embodiments, UE 110a-110f are mobile devices having multi-mode communication capabilities and are able to communicate with small cell radio(s) 130a-130d and/or macro cell radio(s) 140a-140b using one or more internal cellular radios (e.g., transmitters/receivers) capable of mobile cellular connections such as 4G/LTE, 3G, and/or 2G connections. In various embodiments, UE 110a-110f can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 110a-110f may also be inclusive of a suitable interface to a human user such as a microphone, a display, a keyboard, or other terminal equipment. As used herein in this Specification, the terms 'user' and 'subscriber' may be used interchangeably.

UE 110a-110f may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 110a-110f may have a bundled subscription for network access and application services (e.g., voice, multimedia), etc. Once an access session is established for a given user, the user can register for application services as well without additional authentication requirements. IP addresses can be assigned using dynamic host configuration protocol (DHCP), Stateless Address Auto-configuration, default bearer activation processes, etc., or any suitable variation thereof.

In general, macro cell radios 140a-140b can offer suitable connectivity to one or more UE (e.g., UE 110a-110f) via respective coverage areas for the macro cell radios for one or more radio access networks (e.g., 4G/LTE, 3G, 2G) using any appropriate protocol or technique. Various example macro cell radio coverage areas are discussed in further detail herein in this Specification with respect to FIG. 1B. For 4G/LTE deployments, macro cell radios 140a-140b can be deployed as evolved Node Bs (interchangeably referred to as eNodeBs or eNBs) and for 2G/3G deployments macro cell radios 140a-140b can be deployed as Node Bs (interchangeably referred to as NodeBs or NBs).

In general, eNodeBs for macro cell networks can be responsible for selecting a Mobility Management Entity (MME) (not shown) within mobile core network 118 for session establishment for each UE 110a-110f, for managing radio resources for each UE 110a-110f, and making handover (e.g., hand-out) decisions for UE 110a-110f. In general, a NodeB can be deployed in combination with a Radio Network Controller (RNC), which can be included within or separate from NodeB equipment. For 2G/3G deployments, the combination of NodeB/RNC can perform similar functions as an eNodeB. In various embodiments for 2G/3G deployments, one or more RNC(s) 142 can be provided in communication system 100 to serve macro cell radios 140a-140b, each having NodeB capabilities.

In various embodiments, small cell radio(s) 130a-130d can offer suitable connectivity to one or more UE (e.g., UE 110a-110f) via respective coverage areas for the small cell radios for one or more radio access networks using any appropriate protocol or technique. Only a coverage area (dashed-line hexagon) for small cell radio 130a is shown in FIG. 1A, however, it should be understood that other small cell radio(s) 130b-130d can also provide similar coverage areas. For 4G/LTE deployments, small cell radio(s) 130a-130d can be deployed as Home evolved Node Bs (HeNBs) and for 2G/3G deployments, small cell radio(s) 130a-130d can be deployed as Home Node Bs (HNBs) in communication with one or more RNCs. In general, HeNBs and/or HNBs/RNCs, respectively, can perform similar functions as eNodeBs and or NodeBs/RNCs, respectively, for example, for managing handover decisions (e.g., service hand-outs, etc.) for UE 110a-110f. In various embodiments, small cell radio(s) 130a-130d can be dual stack radio devices, which can be configured, for example, to provide both 4G/LTE and WiFi connectivity or can be triple stack radio devices, which can be configured, for example, to provide 4G/LTE, 3G/2G and WiFi connectivity. Thus, in general terms, small radio(s) 130a-130d can represent radio access devices that can allow UE to connect to a wired network using 4G, 3G, 2G WiFi, WiMAX or any other appropriate standard.

Hence, the broad term 'small cell radio' can be inclusive of a wireless access point (WAP), a femtocell, a hotspot, a picocell, a WiFi array, a wireless bridge (e.g., between networks sharing same Service Set Identifier (SSID) and radio channel), a wireless local area network (WLAN), an HNB, an HeNB or any other suitable access device, or combination thereof, which may be capable of providing suitable connectivity to one or more UE. In certain cases, a given small cell radio can connect to a router (via a wired network), which can relay data between the UE and other UE of the network. Note as referred to herein in this Specification a 'small cell radio' (e.g., any small cell radio 130a-130d) may also be referred to interchangeably as an 'HNB', an 'HeNB', a 'small cell', a 'small cell access point', a 'femtocell', a 'femto' or a 'picocell'.

Small cell gateway 132 may aggregate connectivity of small cell radios 130a-130d to mobile core network 118. In various embodiments, small cell management system 134 may be used to provision small cell radios 130a-130d according to one or more management or communication protocols and/or data models. For example, small cell management system 134 can provision small cell radio 130a-130d according to technical report 069 (TR-069) protocol using the TR-196 version 2 data model, in at least one embodiment. In various embodiments, small cell radios 130a-130d can be deployed in business (e.g., enterprise) environments within predefined clusters or grids that can be optimized to provide contiguous or overlapping cellular/mobile coverage for enterprise users (e.g., employees, visitors, etc.) when such users are located within a coverage area of small cell radio deployed in such a cluster/grid. Typically, small cell radios operate at lower power levels as compared to macro cell radios to provide coverage in a business or residential environment (e.g., within a building, home, etc.).

In various embodiments, small cell management system 134 can also be used to configure or manage grid or cluster information for groups of small cell radios including, but not limited to, configuring grid/cluster identities (IDs) for different grids/clusters, configuring cell IDs for small cell radios (e.g., local or global), configuring physical layer identifiers (e.g., primary scrambling code (PSC), physical cell identity (PCI)), configuring location area code (LAC), routing area code (RAC), tracking area code (TAC) for small cell radios, combinations thereof or the like.

Before detailing various operational aspects of FIG. 1A, it is important to understand common characteristics of service hand-outs, as generally provided in commercial architectures. The following foundation is offered earnestly for teaching purposes only and, therefore should not be construed in any way to limit the broad teachings of the present disclosure.

A handover, as generally referred to in commercial architectures, typically occurs when service for a given UE is handed over from a source or serving cell radio to a destination or target cell radio. From the perspective of the source or serving cell radio, the handover is viewed as a hand-out of the UE, and from the perspective of the destination or target cell radio, the handover is viewed as a hand-in of the UE.

In some cases, handovers can be coverage or mobility based, for example, when a given UE transitions from the coverage area of a serving cell radio to the coverage area of another cell radio a handover may be performed from the serving cell radio to another cell radio. To perform such a mobility based handover, the UE may provide its source or serving cell radio measurement reports, which include signal strength information of neighboring cell radios. Based on the measurement reports, the serving cell radio can initiate a handover to a particular destination cell radio having the strongest reported signal strength in the measurement reports. In some cases, mobility based handovers can be intra-frequency (e.g., having a same carrier frequency) handovers for between cell radios of a same Radio Access Technology (RAT) type (e.g., 4G/LTE cell radio to 4G/LTE cell radio for a same carrier frequency) or can be inter-frequency (e.g., having a different carrier frequency) handovers between cell radios of same RAT type (e.g., 4G/LTE cell radio to 4G/LTE cell radio for different carrier frequencies). In some cases, coverage areas of particular RAT types may be limited or non-existent altogether, in which cases, inter-RAT handovers can be performed between cell radios (e.g., between a 4G/LTE cell radio and a 3G/UMTS cell radio).

In other cases, a given UE may request a certain service from its current RAN node (e.g., source/serving cell radio), which the current RAN node cannot provide or does not support. In such cases, the service request can trigger a service hand-out for the UE from the current RAN node to a neighboring RAN node that can provide the service. The neighboring RAN node can be an inter-frequency RAN node (e.g., different carrier frequency for same RAT type) or an inter-RAT RAN node (e.g., different RAT type), depending on the service requested and the provisioning of the service in the RAN (e.g., which cell radio(s), frequencies, etc. are configured for providing the service). As referred to herein in this Specification, the terms 'service hand-out' and 'service handover' can be used interchangeably.

Performance requirements or metrics can be associated with service hand-outs depending on the type of service for which a hand-out is to be performed. In general, performance metrics can be provided to ensure completion of a service hand-out such that the service can be provided to UE. For example, if a service hand-out is needed for a given UE for a delay sensitive service such as a voice call or a video call, the hand-out can include a given time-based performance metric, which may indicate a time that is critical for the source node to be able to offload this service (e.g., this UE) to an appropriate destination node. Failure to do so within the stipulated time for the time-based performance metric may result in either a service establishment time-out (e.g., call failure) and/or a user inconvenience. Consider, for example, if the service being offloaded is a voice emergency call; in such a case, the failure to offload the service within the stipulated time could have serious consequences to the user.

The problem of meeting such performance metrics is often aggravated in 4G/LTE small cell ad-hoc network deployments having an overlaid UMTS (e.g., GSM) access network in which circuit switched (CS) fall back (CSFB) is the method used to offload voice and video call services to UMTS (GSM) nodes. In a typical UMTS overlaid network, there may be several cell radios around a given 4G/LTE small cell radio and hence a measurement by a given UE seeking to initiate a voice or video call to determine the best cell radio for hand-out is often needed. In cases in which the UMTS network is deployed as an ad-hoc network it is even more important to select the best cell to offload a given UE as coverage and capacity of UMTS ad-hoc networks can change dynamically.

A reliable service handover typically requires reliable UE measurements. However, reliable UE measurements are often an overhead for service handovers and often cannot be accommodated a given UE requesting a service that is not provided by its current node. For example, upon determining that its current node does not support a requested service for the UE, there is typically a small time needed to trigger measurement reporting for the UE and therefore only a small window in which the UE can filter aberrations of signal strength measurements. Because there is only a small window in which to filter aberrations, the UE could just report the first cell radio it sees, which may not necessarily be the best cell radio to provide the service. To ensure that UE measurements are reliable would mean that UE would need sufficient time to perform reliable signal strength measurement and/or any filtering, which would delay the handover. One solution to this timing problem might include storing previous measurement reports for each UE, however, storing previous measurement reports would not be useful for ad-hoc networks in which coverage and capacity can dynamically change. Further, performing measurements by all the UEs in the system would reduce the performance of the system as inter-frequency and inter-RAT measurements typically involve measurement gaps (e.g., gaps in transmission of measurement reports), which can introduce additional handover delays.

In accordance with one embodiment, communication system 100 can overcome the aforementioned problems (and others), by providing a system and method to facilitate service hand-outs for UE (e.g., any of UE 110a-110f) in a network environment using UE groups. In various embodiments, communication system 100 can provide a method for: creating one or more clusters or groups of UE (e.g., UE 110a-110f) by a given serving cell radio (e.g., small cell radio 130a), based, at least in part, on approximate UE locations and the proximity of each UE to each other (e.g., UE positions) within the coverage area of the serving cell radio; selecting a master UE among each group to perform service hand-out inter-frequency and/or inter-RAT measurements for each group as a whole (the other UE of the group can be considered follower UE); using inter-frequency and/or inter-RAT measurements from the master UE for a given group to accelerate handovers for follower UE of the group without the follower UE performing inter-frequency or inter-RAT measurements on their own. In general, the master UE selected for each group can, in various embodiments, provide feedback information for each group, which can be used to configure and/or guide UE within the group for, among other things, service hand-outs. In various embodiments, the method provided by communication system 100 can include managing the performance of each cluster or group (e.g., how well a cluster or group provides for successful service handouts) through various updates to the group (e.g., adjusting the size of a group, selecting a new master, adjusting the periodicity of master UE measurements, etc.).

In at least one embodiment, the clusters or groups of UE can be created using location information for each UE, which can be obtained using intra-frequency measurements of at least two intra-frequency neighboring cells and triangulating the approximate location for each UE within the coverage area of a given serving cell radio (e.g., small cell radio 130a). In various embodiments, triangulation can include using received signal strength indication (RSSI), time difference of arrival (TDOA), combinations thereof or the like to determine an approximate location for each UE 110a-110f served by small cell radio 130a. Based on the location of each UE 110a-110f, serving small cell radio 130a can determine the positions and proximity of each UE in relation to each other within its coverage area. In at least one embodiment, the approximate location for each UE 110a-110f can be determined by monitoring geolocation events derived from Global Positioning System (GPS) information for each UE, assuming each UE 110a-110f is configured with a corresponding GPS transceiver to receive/transmit GPS information.

Consider an operational example in which each small cell radio 130a-130d is deployed as an intra-frequency 4G/LTE small cell radio (e.g., HeNB), each macro cell radio 140a-140b is deployed as a 3G macro cell radio (e.g., NodeB) and UE 110a-110f are served by small cell radio 130a. In various embodiments, the method provided by communication system 100 can be based on various assumptions, including: that there are two or more intra-frequency neighbors for a serving/source cell [note having two or more intra-frequency neighbors is typically a pre-requisite for determining approximate UE location using triangulation]; that there is enough UE density in the neighborhood/vicinity of a small cell radio coverage area (e.g., there are multiple UE in the coverage area); that UE receiver performance does not vary much among UEs of different make and/or vendor; and/or that the coverage from cells used for guiding service-handouts for groups may not have sharp drops, for example, the coverage should be such that the signal strength of a given cell can be assumed to be approximately constant with small changes in distance.

During operation, for example, the method provided by communication system 100 can include small cell radio 130*a* enabling UE 110*a*-110*f* to perform intra-frequency measurements (e.g., same carrier frequency but different cell identity (ID)) for intra-frequency small cell neighbors (e.g., any of small cell radios 130*b*-130*d*). Enabling intra-frequency measuring can trigger intra-frequency measurement reporting for UE 110*a*-110*f*, in which each UE 110*a*-110*f* may communicate an intra-frequency measurement report, according to a configured periodicity, to serving small cell radio 130*a*. Using the intra-frequency measurement report(s) received from UE 110*a*-110*f*, small cell radio 130*a* can perform a triangulation for each UE 110*a*-110*f* to determine an approximate location of each UE 110*a*-110*f* within the coverage area of small cell radio 130*a*. Based on the approximate location of each UE 110*a*-110*f*, small cell radio 130*a* can determine a fair or approximate estimation of the distribution of UEs within its coverage area as well as the proximity of each UE 110*a*-110*f* to each other within its coverage area. The proximity of each UE 110*a*-110*f* can provide at least one basis for grouping UE 110*a*-110*f* into one or more UE groups.

In at least one embodiment, intra-frequency measurement reports can include Reference Signal Received Power (RSRP) signal strength information, as defined in 3GPP standards, for neighboring cell radios (e.g., two or more of small cell radios 130*b*-130*d*) and serving/source small cell radio 130*a* to locate the position of each UE in the coverage area of small cell radio 130*a*. In another embodiment, intra-frequency measurement reports can include Reference Signal Received Quality (RSRQ) signal strength information, as defined in 3GPP standards, for neighboring and source cell radios. In yet another embodiment, intra-frequency measurement reports can include common pilot channel (CPICH) energy per chip to total interference (Ec/Io), as defined in 3GPP standards, for neighboring and source cell radios. In yet another embodiment, intra-frequency measurement reports can include Received Signal Code Power (RSCP), as defined in 3GPP standards, for neighboring and source cell radios.

In at least one embodiment, small cell radio 130*a* can select or group UE 110*a*-110*f* into one or more groups based, at least in part, on their proximity to each other as can be determined using the RSRP readings present in each UE's 110*a*-110*f* measurement report for the cells used in the triangulation. In various embodiments, cells used in triangulation of UE location/position can be selected based on signal strength information (e.g., RSRP, RSRQ, RSCP, CPICH Ec/Io, etc.) included in intra-frequency measurement reporting for each UE. For example, it at least one embodiment, a serving cell radio may select the top two highest signal strength intra-frequency neighbors in combination with the received signal strength for the serving cell in order to triangulate the positions and proximity of UE to each other within the coverage area of the serving cell.

Consider, for the present example, that RSRP readings (e.g., signal strength information) for small cell radios 130*a*, 130*b* and 130*d* or small cell radios 130*a*, 130*b* and 130*c* can be used in triangulating the locations of UE 110*a*-110*d* and determining their positions in proximity to each other within the coverage area of small cell radio 130*a* in order to group UE 110*a*-110*d* into a first UE group, shown in FIG. 1A as 'UE Group 1' based on their location in proximity to each other. Similarly, RSRP signal strength information for small cell radio 130*a*, 130*c* and 130*d* can be used in triangulating the of UE 110*e*-110*f* and determining their positions in proximity to each other within the coverage area of small cell radio 130*a* in order to group UE 110*e*-110*f* into a second UE group, shown in FIG. 1A as 'UE Group 2' based on the location in proximity to each other. In various embodiments, a UE group should consist of at least two UE.

Following the grouping of UE 110*a*-110*d* into UE Group 1 and UE 110*e*-110*f* into UE Group 2, small cell radio 130*a* may choose a master UE for each group. The rest of the UE not selected as the master in each group may become followers for each group. A master UE chosen for a UE group may bear the responsibility to provide feedback information for the group such as, for example, performing intended service hand-out measurements (e.g., measuring a target inter-frequency and/or a target inter-RAT) to guide service handovers for all UE in the UE group. In some cases, a higher density of UEs in a group may imply a higher number of followers for the group, which can, in various embodiments, lead to a reduced overall cost of service hand-out measurements as less UEs served by a given cell radio may bear the added responsibility of being a master.

As referred to herein in this Specification, a master UE for a given UE group can be referred to using a '$UE_{MASTER(GROUP)}$' label. In various embodiments, one or more UE characteristics can be considered in selecting a master UE for a group including, but not limited to, UE location within a group UE and/or UE data rate. In at least one embodiment, a given UE which is determined to be at approximately the center of a given group (e.g., whose position/location with respect to other UE in the group has been determined using intra-frequency measurements) can be chosen as the master UE to provide feedback information (e.g., service hand-out measurements) for the group in order to guide the group for service handovers. For example, during operation, UE 110*a* can be selected by small cell radio 130*a* as the master UE for UE Group 1 (e.g., $UE_{MASTER(1)}$) based, at least in part, on its location being at approximately the center of UE Group 1 in relation to other UE 110*b*-110*d* of the group. Thus, UE 110*b*-110*d* can be considered follower UE for UE Group 1.

In another embodiment, a data rate for each UE in a group in combination with a position/location of each UE in proximity to each other in the group can be used to determine a master UE for the group. As service measurement reporting may be extra overhead for UE operation and may also result in measurement gaps for UE operation, it may be advantageous to determine UE in a given UE group having a lower data rates in comparison to other UE in the UE group. In various embodiments, one or more low data rate UE in a UE group can be flagged as candidate UE for selection as a master UE.

In at least one embodiment, the location of candidate UE can be assessed to determine one or more candidate UE at an approximate center of the group having lower data rates in comparison to other UE of the group and from these candidate UE a master UE can be selected having the lowest data rate that is at an approximate center of the group.

In another embodiment, data rate alone for each UE in a group can be used to determine a master UE for the group. In some cases a UE group may consist of only two UE, such as, for example, UE Group 2 including UE 110e-110f. In such cases, determining a UE at approximately the center of the group may be difficult to determine. Accordingly, data rate alone can be used to determine a master UE for a group. It is assumed for purposes of the present operational example that UE 110e has been selected as the master UE for UE Group 2 (e.g., $UE_{MASTER(2)}$)

In various embodiments, a data rate for each UE in a group can be inferred using one or more techniques to determine one or more candidate UE in the group for possible selection as a master UE. In at least one embodiment, a number of QoS Class Identifiers (QCIs) configured for each UE in a group can be evaluated to infer the data rate of each UE in the group. Typically, a UE is configured with a default bearer upon attaching to a given cell radio. The default bearer may have associated thereto a given QCI. However, if any additional specific traffic is configured for the UE, other QCIs can be configured for the traffic. For example, Voice over LTE (VoLTE) traffic may have associated therewith a QCI=1, Session Initiation Protocol (SIP) traffic may have associated therewith a QCI=5, and so on for other traffic that can be configured for a UE. As additional QCIs can be associated with additional traffic for a given UE, the number of QCIs for each UE in a group can be considered to infer a data rate for each UE in the group according to one embodiment such that a fewer number of QCIs can be associated with a lower data rate for a given UE. In this manner, candidate UE having lower data rates in comparison to other UE of a group can be determined for possible selection as a master UE for the group.

In at least one embodiment, an assessment of data packets associated with each UE of a group for one or more protocol layers of a serving cell radio (e.g., small cell radio 130a) can be evaluated to infer a data rate for each UE of the group. Generally, cell radios can include a transmitter and a receiver, each including various protocol layers associated with communicating data to and from UE. In various embodiments, the protocol layers can include a Packet Data Convergence Protocol (PDCP) layer, a Radio Link Control (RLC) layer, a Media Access Control (MAC) layer and a physical (PHY) layer. Each layer may operate on data packets that are to be transmitted to UE or that are received from UE. Typically, the PDCP layer can provide for packet compression/decompression, transfer of user data, etc.; the RLC layer can provide for error correction, transfer of packet data units (PDUs), segmentation, etc.; the MAC layer can provide for packet scheduling; and the PHY layer can provide an over-the-air interface for communicating packets to UE. The MAC layer can additionally include a buffer, which may provide for buffering packets that are to be transmitted to UE or that are received from UE. In at least one embodiment, a data rate for each UE can be determined based on data rate at the PDCP layer for downlink data (e.g., data to be transmitted to each UE) and/or MAC buffer occupancy for uplink data (e.g., data received from each UE) in order to determine one or more candidate UE having lower data rates in comparison to other UE of the group for possible selection as a master UE for the group.

In at least one embodiment, a Modulation and Coding Scheme (MCS) selected for each UE of a group can be used to infer radio conditions for each UE for each UE of the group. In various embodiments, an MCS can be associated with a modulation type including, but not limited to, Binary Phase Shift Keying (BPSK), Quadrature Phase Shift Keying (QPSK), Quadrature Amplitude Modulation (QAM) and variations thereof such as, for example, 16QAM, 64QAM, etc. Each modulation type can be associated with a modulation order, which can proceed in an increasing manner from BPSK to QPSK and further through QAM, 16QAM, 64QAM, etc. Generally, a MCS is chosen for communications with a given UE based on radio communication conditions with the UE. For better radio conditions with a given UE (e.g., UE 110a, for example), a higher order MCS can be selected, which can be associated with a higher potential data throughput rate for the UE. Thus, in at least one embodiment, MCS order can also be used as an indicator through which radio conditions for each UE in a group can be inferred. As inter-frequency and/or inter-RAT measurement reporting for a given master UE can erode uplink bandwidth for the master UE (e.g., communications from the UE to the serving cell radio), one or more candidate UE for a group can be determined for possible selection as a master UE for the group in accordance with one embodiment of the present disclosure such that higher order MCS values can be associated with higher available uplink bandwidth for inter-frequency and/or inter-RAT measurement reporting.

In addition to inferences based on MCS order, the MCS for a given UE coupled with a number of physical resource blocks allocated to the UE (e.g., for uplink and downlink communications) can be used to additionally infer channel conditions for the UE. Per 3GPP standards, a physical resource block (PRB) can be used to communicate resources to/from one or more UE in a cell. Resources can include control resource and data resources. A PRB is comprised of a number of resource elements, each of which can be allocated within a symbol, for each of a particular subcarrier (e.g., frequency), which can be associated with a given UE.

The smallest unit of a PRB is a resource element, which represents one subcarrier by one symbol. Each PRB (or slot) can include six (6) or seven (7) symbols, depending on cyclic prefix configuration. For 4G/LTE, the number of subcarriers for a PRB is 12, each spanning a 15 kilohertz (15 KHz bandwidth). Each resource element for each symbol of a PRB can be represented using a number of bits, which can vary depending on the MCS selected for communications. For example, for a 64QAM, 6 bits/symbol can be used; for 16QAM, four (4) bits/symbol can be used; for QPSK, two (2) bits/symbol can be used and so on, depending on MCS selected for communications with a given UE.

Generally, the number of PRBs allocated to a UE is a function of the data rate and channel conditions for the UE. For example, a low data rate UE can be allocated more PRBs for communications if it is using a lower modulation order and a lower coding rate as this may help to protect data for the communications against loss due to noisy channel conditions. Thus, channel conditions for a UE can also be inferred based on both the number of PRBs and MCS for the UE. In at least one embodiment, determining UE in a UE group that have a lower order MCS in combination with having a high number of PRBs allocated thereto can be used to exclude such UE as candidate UE for possible selection as a master UE for the UE group.

As noted above, measurement gaps can occur for intra-frequency measurement reporting performed by a given UE when the UE switches frequencies and/or RATs to perform inter-frequency and/or inter-RAT measurements. In at least one embodiment, since intended inter-frequency and/or inter-RAT measurement might result in measurement gaps, a given UE chosen to be the master of a given group should be such that its services (e.g., services provided by a current serving/source cell) may not be affected by measurement gaps. In various embodiments, inferring the data rate for each UE of a group based on a number of QCIs configured for each UE and/or determining the data rate for each UE of a group based on PDCP data rate and MAC buffer occupancy can be used for master UE selection such that a selected master UE may have moderate to low data rates in comparison to other UE of the group. However, as channel conditions can also impact the data rate for UE, determining MCS order and/or MCS order in combination with data rate for each UE in a group can be used for master UE selection such that a selected master UE may have a higher order MCS and/or a higher order MCS in combination with moderate to low data rates in comparison to other UE of the group.

In various embodiments, a given cell radio (e.g. small cell radio 130*a*) can store grouping information for one or more UE groups created by the cell radio for identifying each UE group. In various embodiments, grouping information for a UE group can include, but not be limited to, an identity of each UE group (e.g., 1, 2, 3, etc.), identifying information for each UE within a UE group (e.g., International Mobile Subscriber Identity (IMSI), temporary Mobile Subscriber Identity (TMSI), or any other local or global identity), location information for each UE in a UE group, master UE identifying information for a UE group (e.g., which UE is the current master UE), follower UE identifying information for a group, feedback information (e.g., measurement report(s), etc.) for the master UE for a UE group, combinations thereof or the like.

Returning to the operational example in which UE 110*a* has been selected as the master UE for UE Group 1 and UE 110*e* has been selected as the master UE for UE Group 2, small cell radio 130*a* can enable measurement reporting for each selected master UE of each UE group for an intended measurement quantity (e.g., RSRP, RSRQ, RSCP, CPICH Ec/Io, etc.) for one or more target frequency and/or target RAT measurements of any neighboring cell radios that may provide services for potential service hand-outs for the UE of each group. In various embodiments, a service hand-out measurement report for a given master UE selected for a group can include, for each corresponding cell radio measured by the master UE, a value for the intended measurement quantity (e.g., as set by the serving cell radio) and a corresponding cell identifier (ID) for each cell radio measured by the master UE. In various embodiments, a cell ID can be a Physical Cell Identity (PCI) for 4G/LTE cell radios, Physical/Primary Scrambling Code (PSC) for 3G/UMTS cell radios or any other cell ID configured for cell radios of communication system 100.

In various embodiments, an intended measurement quantity and target inter-frequency and/or target inter-RAT measurement selected for a master UE can be as chosen by a network operator and/or service provider. For example, in at least one embodiment, a configuration of what services may be provided/supported in communication system 100, as well as what frequency (or frequencies) and/or RAT type(s) through which corresponding services may be provided/supported can be configured for small cell radios 130*a*-130*d* and/or macro cell radios 140*a*-140*b* by a network operator and/or service provider. In various embodiments, small cell radios 130*a*-130*d* and/or macro cell radios 140*a*-140*b* can be configured to store such information for use in setting target inter-frequency and/or inter-RAT measurement reporting for an intended measurement quantity for each master UE chosen for each group. In various embodiments, an intended measurement quantity could be RSRP and/or RSRQ measurements of a target frequency for inter-frequency neighboring cell radios or could be a measurement quantity intended for inter-RAT neighboring cells, such as, for example, RSCP and/or CPICH Ec/Io measurements of neighboring 3G/UMTS cell(s). For the present example in which macro cell radios 140*a*-140*b* may be deployed as 3G/UMTS macro cell radios to provide one or more CSFB services (e.g., voice, video, etc.), measurement reporting can be enabled for master UE 110*a* for UE Group 1 and master UE 110*e* for UE Group 2 for each master UE to perform RSCP measurements for a targeted RAT type set to 3G/UMTS.

In one embodiment, small cell radio 130*a* can store measurement reports for each respective master UE 110*a* and UE 110*e* in order to determine a best cell radio to receive a service hand-out for any corresponding UE of each of respective UE Group 1 and UE Group 2, for one or more CSFB services that may be requested by any UE for each group. It should be noted that service hand-outs for each UE in a group can be performed for the master UE of the group as well as any follower UE of the group depending on the particular UE requesting a particular service that may be provided by a cell other than the serving cell radio for the group.

In one embodiment, when a given UE in a group requires a service handover (e.g., a service request for the service is received by its serving cell radio), then the serving cell radio can use stored measurement(s) from the master UE for the group to determine the best neighboring cell to receive the service handover of the given UE. For example, assume a service request is received from UE 110*c* in UE Group 1 for a service provided by neighboring macro cell radios 140*a*-140*b*. Upon receiving the service request from UE 110*c*, small cell radio can retrieve the service measurement report(s) received from master UE 110*a* and perform a look-up on the report to determine the best neighboring cell radio to receive the service hand-out for UE 110*c*. In the present example, the service measurement report received from master UE 110*a* may indicate macro cell radio 140*a* as the best neighboring cell radio to receive the service hand-out (e.g., UE Group 1 is nearest to macro cell radio 140*a*, thus, its signal strength was likely measured as a strong neighbor by UE 110*a*). In some cases, if the UE for which handover is requested/performed is the master UE of the group then another UE can be chosen as a new master UE for the group using any of the techniques described herein.

As target inter-frequency/inter-RAT measurement(s) can be periodic in nature and as users/UE can be mobile within communication system 100, the selection of a master UE for groups, as well as the configuration of groups (e.g., size, measurement reporting rate, etc.) can be adapted throughout operation to manage the performance for each group (e.g., how well a group provides for successful service handouts). In various embodiments, a cluster or group's performance can be kept reliable by dividing it into smaller groups and/or adjusting the periodicity intra-frequency, inter-frequency and/or inter-RAT measurement reporting to constantly or nearly constantly assess the performance of the group via the reports of master and followers. Features related to assessing and/or managing the performance of groups may be better understood with reference to the coverage areas of neighboring cells (e.g., macro cell radios 140*a*-140*b*), which are shown in further detail in FIG. 1B.

Figure 1B:
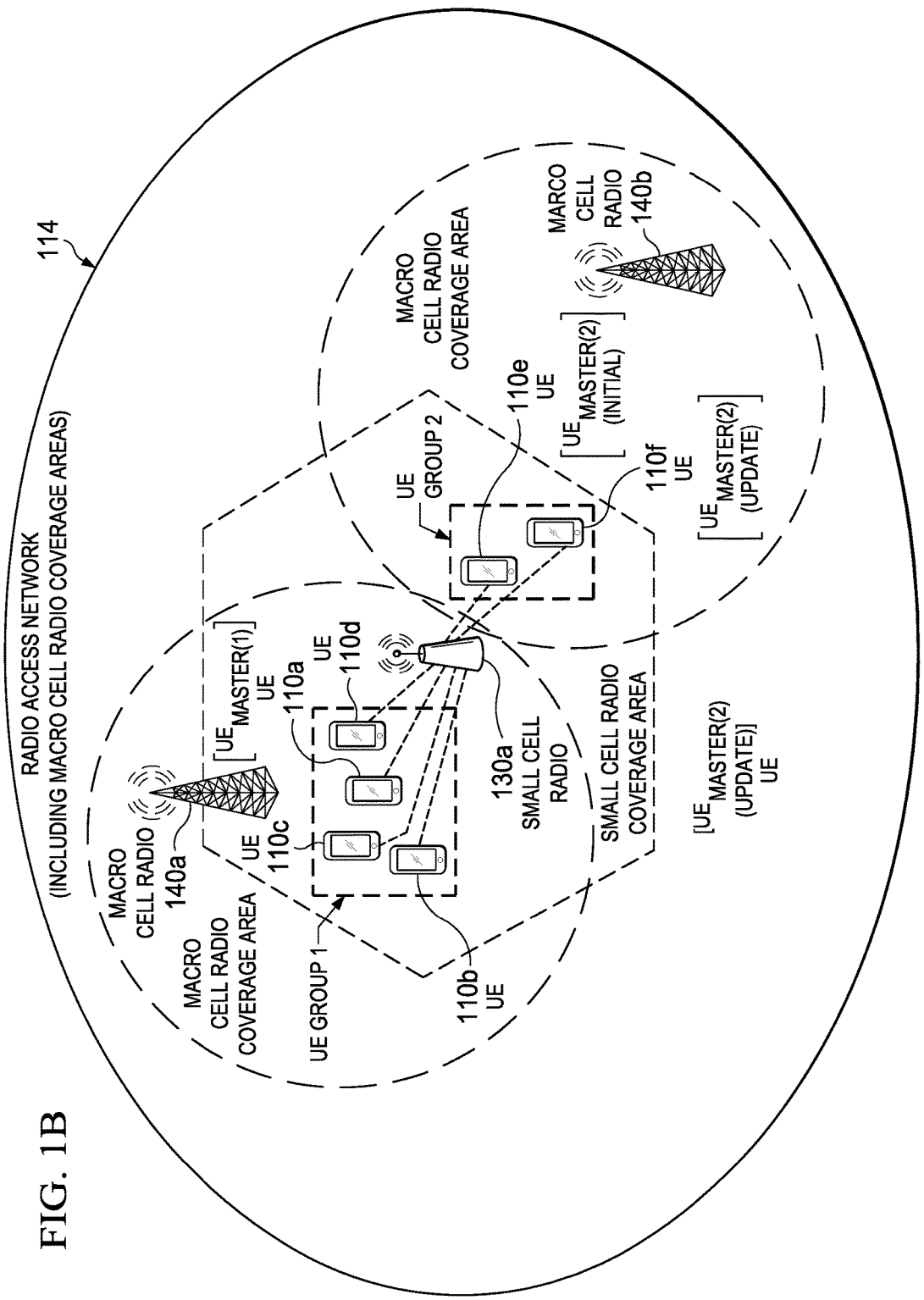
FIG. 1B is a simplified block diagram illustrating additional details associated with one potential embodiment of the communication system.

Referring to FIG. 1B, FIG. 1B is a simplified block diagram illustrating additional details that can be associated with one potential embodiment of communication system 100. FIG. 1B includes RAN 114, small cell radio 130*a*, UE 110a-110f and macro cell radios 140a-140b. A coverage area (dashed line circle) is shown for macro cell radio 140a and another coverage area (dashed line circle) is shown for macro cell radio 140b. As shown in FIG. 1B, the coverage area for macro cell radio 140a can overlap a portion of the coverage area for small cell radio 130a that includes UE 110a-110d for UE Group 1. Also shown, the coverage area for macro cell radio 140b can overlap and a portion of the coverage area for small cell radio 130a that includes UE 110e-110f for UE Group 2.

It should be understood that the size, shape, etc. of the coverage areas for small cell radio 130a and macro cell radios 140a-140b are provided for illustrative purposes only and are not meant to limit the broad scope of the teachings of the present disclosure. Any coverage area for any cell radio, small and/or macro, can be provided within the scope of the teachings of the present disclosure. Note small cell radios 130b-130d are not shown in RAN 114 for FIG. 1B in order to illustrate other features of communication system 100, however, it should be understood that operations described with respect to RAN 114 as shown in FIG. 1B may apply equally to the configuration of RAN 114 as shown in FIG. 1A.

In various embodiments, assessing or measuring the performance of a group and its master UE can be performed using the service hand-out measurement report(s) for a target frequency/RAT selected for the master UE. Based on the service measurement report(s) (e.g., for a target inter-frequency/inter-RAT type) received from a current master UE of a UE group, a given serving cell radio (e.g., small cell radio 130a) can ascertain how well the current master UE for a UE Group (e.g., UE 110a for UE Group 1 and/or UE 110e for UE Group 2) may be in guiding follower UE for the group. In one embodiment, if the service measurement reports from the master UE of a UE group indicates a strong neighboring cell radio (e.g., strong signal strength), then the size of the group (e.g., number of UE in the group) can be increased. For example, if the master UE for a group reports strong inter-frequency and/or inter-RAT neighboring cell radio measurements, this may indicate that it is close to a neighboring cell radio and hence the master UE could accommodate more followers or serve its current followers satisfactorily. In some embodiments, determination of a strong neighboring cell radio can be based on a comparison of the intended quantity for service hand-out measurements against one or more high signal strength thresholds. In some embodiments, multiple signal strength measurement thresholds can be used to infer a relative strength of multiple neighboring cell radios that may be measured by one or more groups served by a given serving cell radio.

As shown in FIG. 1B, UE Group 1 including UE 110a-110d may be indicative of a group whose size can be large (or may even be further increased in size) to accommodate more followers as it is likely that master UE 110a may report strong service hand-out measurements for macro cell radio 140a because master UE 110a is near the interior of the coverage area for macro cell radio 140a.

In some cases, upon determining that a strong neighbor is seen by a particular master UE of a particular group, the serving cell radio may, in certain embodiments, check the area near the particular group to determine if any neighboring groups could be annexed into a single large group including the particular master UE. In one embodiment, the intended quantity for service hand-out measurement reports (e.g., inter-frequency and/or inter-RAT measurement reports) can be compared against one or more high signal strength threshold levels, which the serving cell radio may use to determine whether or not to attempt to annex any neighboring UE groups into a single large group and/or to determine an approximate number of UE to attempt to annex into the single large group. In another embodiment, the serving cell radio could make the determination of whether or not to attempt to annex and/or a number of UE to attempt to annex into a single large group based on one or more high signal strength threshold level comparisons in combination with an evaluation of the location of the UE in any neighboring groups.

In another embodiment, if service measurement report(s) from a current master UE of a UE group indicates a weak neighboring cell radio (e.g., weak signal strength), then the current master for the group could be changed or updated in an effort to select another master for the group having reporting stronger service measurements for a target inter-frequency/inter-RAT type of a neighboring cell radio. In various embodiments, the selection and/or re-selection of a master UE for a UE group can be repeated until a good master (e.g., having the strongest service measurement reports for the target frequency/RAT type) is found for the UE group. In yet another embodiment, if service measurement report(s) from a current master UE of a UE group indicates a weak neighboring cell radio then the size of the group can be decreased by dividing the group into several smaller groups and selecting a new master UE for each smaller UE group. In yet another embodiment, if service measurement report(s) from a current master UE of a UE group indicates a weak neighboring cell radio then the size of the group could be decreased by shedding some of the follower UE from the periphery of the group, in which case another master UE could be selected for the decreased size group. In various embodiments, UE shed from the periphery of a group can be re-selected into one or more other groups depending, at least in part, on their proximity in relation to each other as determined from intra-frequency measurement reports for the UE. In some embodiments, determination of a weak neighboring cell radio can be based on a comparison of the intended quantity for service hand-out measurements against one or more low signal strength thresholds.

As shown in FIG. 1B, UE Group 2 may be indicative of a group whose size can be small or may accommodate less followers (e.g., down to a minimum group size of two UE) and whose master UE may be updated in an effort to select another master UE for the group that may be a better leader for the group. As shown in FIG. 1B, UE 110e and UE 110f are at the edge of the coverage area for macro cell radio 140b. Consider, for example, that upon grouping UE 110e and UE 110f into UE Group 2 and selecting UE 110e as the initial master UE for UE Group 2 that master UE 110e may report weak service measurements (e.g., lower than one or more low signal strength thresholds) to small cell radio 130a for neighboring macro cell radio 140b. In an effort to select a better master UE for UE Group 2, serving small cell radio 130a may also enable service measurements for UE 110f for the target RAT (e.g., 3G/UMTS) for UE Group 2. As UE 110f may be closer in proximity to macro cell radio 140b, it can be assumed that the service measurements for UE 110f may be higher than the service measurements for UE 110e in which case serving cell radio can update the master UE selection for UE Group 2 to be UE 110f. Accordingly, master UE for UE Groups can be selected and re-selected to improve the performance of UE groups.

Since groups can be fluidic in nature (e.g., due to movement of users/UEs and/or changes in radio conditions of an ad-hoc network) group dynamics may also be accounted for in order to assess and/or manage the performance of groups.

For example, if a particular follower UE in a particular group changes location, the proximate location of the UE in relation to the particular group can be re-evaluated, in various embodiments, to determine whether the follower UE may need to be deleted from an existing group, added to another existing group and/or added into an altogether new group (e.g., update grouping information for UE Groups). In various embodiments, the determination of grouping or re-grouping UE may not cause any additional signaling overhead for the method provided by communication system 100 as this is a logical segregation. However, if a master UE of a particular group moves its location, then the proximate location of the UE in relation to the particular group can be re-evaluated, in various embodiments, to determine whether a new master UE should be chosen for the group. In various embodiments, this may result in a signaling overhead of deleting any existing service measurement reporting for the old master UE and enabling new service measurement reporting for a newly selected master.

In some embodiments, in case there is a failure to form a UE group for a given UE (e.g., the UE could not be grouped with a second UE), then the UE may not trigger the pre-emptive service measurement techniques used in the method provided by communication system 100. Instead, for UE that cannot be selected into a group, such UE may, in certain embodiments, attempt to measure the service neighbors as and when a given service is requested of them. Accordingly, in some cases, the method provided by communication system 100 may be error prone, as there may exist a possibility that a service hand-out for a service hand-out candidate may fail due to movement of follower UE or a master UE of a UE group from their previously triangulated position. In such cases if a service handover (e.g., hand-out) fails then the candidate should fall back to the conventional method of measuring a given service frequency/RAT.

In some cases, there could be regions within the coverage area of a cell radio where there may be frequent failures due to rapid changing environment (e.g., for an ad-hoc deployment) or frequent UE movement. For example, for hallways and/or elevators within a structure there may be frequent UE movement as people migrate about the structure. Thus, in various embodiments, cell radios in communication system 100 may be configured to maintain a memory for flagging regions that experience failures due to a rapidly changing environment (e.g., cells being added/removed, turned on/off, having fluctuating coverage areas, etc.) and/or frequent UE movement. In various embodiments, the performance of groups within such regions and overall robustness of the system may be increased by employing techniques such as grouping UE into smaller groups for such regions and/or lowering the periodicity of measurements (e.g. decreasing the time between measurements) for groups lying in such regions. For example, decreasing the size of groups and/or increasing triangulation measurement periodicity (e.g., lowering the time between such measurements) could increase the success rate of service hand-outs for such regions in various embodiments.

However, some regions may experience very high UE movement, such as, for example corridors that lead to/from exits/entrances in which people are often entering or leaving a structure. By flagging regions having very high UE movement, a given serving cell radio may determine, in certain embodiments, that no groups should be formed in such regions. In various embodiments, one or more regions of high/very high movement, having a rapidly changing environment, having high interference, etc. can be flagged and/or identified using GPS coordinates, a coverage map, facility map, etc. configured by a network operator and/or service provider which may be used by a given cell radio in managing the performance of UE groups within regions.

Additionally, the method provided by communication system 100 could be used at cell boundaries, in various embodiments, if there are sufficient low profile UEs (e.g., UEs having a low data rate, good channel conditions, etc. selected as master UEs for various groups) available for measuring neighboring cell radios for mobility handover purposes. By sufficient, it is meant that there are enough UE at various edges of the coverage area of a serving cell radio such that the edges (or boundaries) of the coverage area are sufficiently covered by low profile UE communicating measurement reports to the serving cell radio. With sufficient coverage at the edges of the coverage area of the serving cell radio, measurement reports from the low profile UE can be used, in some embodiments, to reduce the time of performing mobility based handovers when UE move out of the coverage area of the serving cell radio. In various embodiments, these low profiles UEs (e.g., master UEs) could be configured to perform both Automatic Neighbor Relation (ANR) measurements as well as inter-frequency measurements at cell boundaries for mobility handover purposes. In various embodiments, neighbor relationships between neighboring cell radios within communication system 100 can be managed using the ANR measurements performed by such low profile UEs.

Accordingly, in various embodiments, various advantages may be achieved using the method provided by communication system 100. For example, most of the smart phones these days are data intensive and are always or almost always connected. Based on an assumption of constant or nearly constant connection would mean that when a device seeks a service, it is likely that the service is already in a packet call. Thus, it is likely that the serving cell radio for the device already has some measurements for the device that can be used for triangulation of the device that could be used to provide a quick service handover for the device, whether the device is either already in a group or just near a group for which service measurements have been performed. However, if a UE attaches to a given cell radio merely for the purpose of accessing a service which the cell radio does not support, then the method provided by communication system 100 may be less beneficial. In such cases, conventional measurement reporting for service handovers may be employed.

As noted above, for conventional service handovers, a given UE typically has to be configured to measure a neighboring cell and, in order to provide reliable measurements, should be given sufficient time to filter any aberration in this measurement. The measurement report is then communicated to the UE's serving cell to trigger the service handover for the UE. Generally, this process can take a few seconds, which, for some services (e.g., voice, video, etc.) could be detrimental to the service and/or cause the service handover to fail altogether. In various embodiments, by selecting a master UE for a UE group to perform service measurements for all UE in the UE group, the method provided by communication system 100 could cut the needed time to configure such measurement reporting as well as the time needed to wait for a measurement report, which could improve reliability and/or robustness for service handovers within the communication system.

As intra-frequency measurement reporting of neighbors is often performed by UE, the method provided by communication system 100 may provide another advantage in that the method may not introduce additional overhead for triangulating a position of UE. However, in environments in which UEs may be sparsely distributed, using the method provided by communication system 100 may result in many master UEs being selected to perform inter-frequency and/or inter-RAT measurements, thereby introducing the possibility of many UE in the environment having measurement gaps in their intra-frequency measurement reporting, which could impact system performance.

In some embodiments, when implementing the method provided by communication system 100, the measurement reporting occasion (e.g., period) for a given service frequency and/or service RAT measurement and a given intra-frequency measurement should be configured to be close to each other in time. Otherwise, triangulation operations for determining UE positions using intra-frequency measurements could result in a stale repot (e.g., a stale group) to be chosen for a service handover. However, this problem can be overcome in at least one embodiment, by continuously or nearly continuously assessing the performance of UE group(s) using any of the techniques described herein and selecting a periodicity that more closely aligns the measurement reporting occasions. In at least one embodiments, inter-frequency and/or inter-RAT service measurement reporting and intra-frequency measurement reporting can be configured for a given UE using a single message (e.g., a Radio Resource Control (RRC) reconfiguration message, as defined in 3GPP standards), which can be communicated to a given master UE of a given UE group.

Other advantages can be realized using the method provided by communication system 100. For example, in cases in which an intended service provider may have cell radios as part of an ad-hoc network, merely storing previous service measurement reports for all UE in the system may not be useful. In an ad-hoc network (e.g., small cell deployment) the radio environment may be rapidly changing, which could result in constant monitoring being needed for service neighbors. In various embodiments, the method provided by communication system 100 may be beneficial for use in ad-hoc networks, as service measurement reports could be periodically (e.g., as set by a network operator and/or service provider) for one or more UE groups; thereby providing an updated view of the RAN topology and/or user distribution of the system. By offloading the monitoring to a less loaded UE, the performance of communication system 100 may be increased.

In various embodiments, the method provided by communication system 100 could also provide benefits when used in networks that are more static in nature. In environments in which inter-frequency and/or inter-RAT service providing nodes are also static in nature, the method provided by communication system 100 could still be used to assess the quality of such nodes. In some embodiments, the method provided by communication system 100 could be used to determine loading of neighboring cells in order to determine a best suited (e.g., less loaded) cell for service handovers. For example, in various embodiments, for inter-frequency LTE cells, RSRQ measurements could be used and for inter-frequency 3G/UMTS cells, CPICH Ec/Io measurements could be used to determine a best suited cell for service handovers.

Further, small cells are often deployed in areas that experience pedestrian traffic in which increased speed for service handovers may be a requirement for successful handovers. In various embodiments, the method provided by communication system 100 may be ideally suited for coffee house deployments of small cells where the user environment is pedestrian (or closely static) in nature and expected to have significant user density. In such pedestrian or closely static environments in which UEs may be densely located in close proximity to each other, the method provided by communication system 100 may provide reduced signaling overhead for service handovers, as it may be possible to group many UE followers into a group guided by a selected master UE. The signaling overhead that would otherwise be consumed by the UE followers can be removed from the system using the method provided by communication system 100 in which the master UE for the group may perform service measurements for the group as a whole.

Figure 2A:
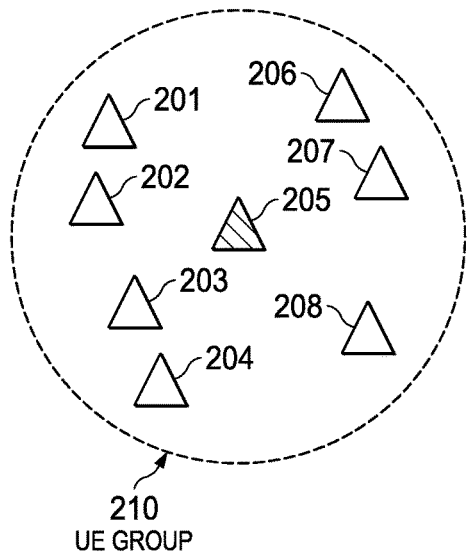
FIGS. 2A-2C are simplified schematic diagrams illustrating example details associated with an example use case in accordance with one potential embodiment of the communication system.
Figure 2B:
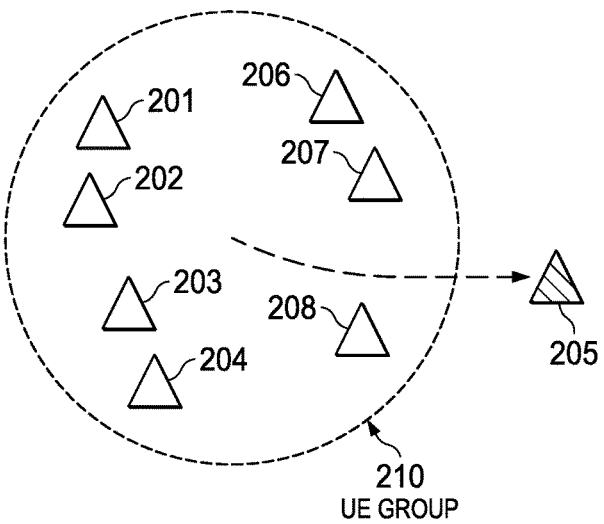
Figure 2C:
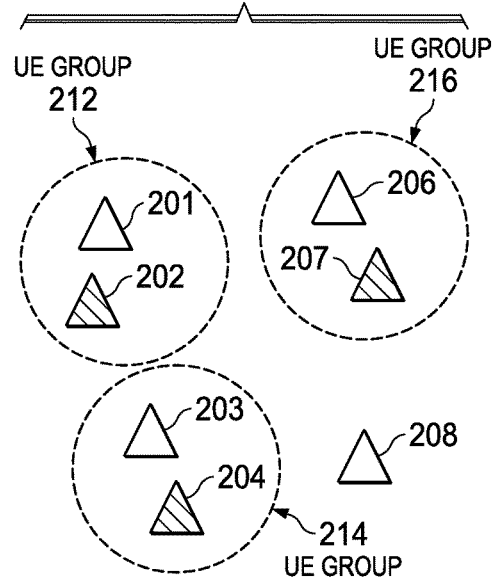

Turning to FIGS. 2A-2C, FIGS. 2A-2C are simplified schematic diagrams illustrating example details associated with an example use case in which a given master UE leaves a given UE Group in accordance with one potential embodiment of communication system 100. FIG. 2A includes users operating UE 201-208 within a UE Group 210 in which UE 205 has been selected, by a cell radio serving UE 201-208, as a master UE for UE Group 210 (e.g., $UE_{MASTER(310)}$) in one embodiment based on, for example, UE 205 being at an approximate center of UE Group 210. The serving cell radio is not shown in FIGS. 2A-2C in order to illustrate other features of communication system 100; however, it should be understood that any small cell radio 130a-130d or any macro cell radio 140a-140b as shown in FIGS. 1A-1B can be the serving cell radio for UE 201-208. UE 201, UE 202, UE 203, UE 204, UE 206, UE 207 and UE 208 may be indicated as followers for UE Group 210 for the serving cell radio. In FIG. 2B, it is assumed that master UE 205 moves its location, which results in UE 205 being out of the proximity with UE 201, UE 202, UE 203, UE 204, UE 206, UE 207 and UE 208.

Based on a determination that master UE 205 has exited UE Group 210, the remaining follower UE for UE Group 210 can be re-grouped into one or more groups based on their proximity to each other and a new master UE can be selected for each of the one or more groups using the method provided by communication system 100. FIG. 2C illustrates example UE groupings including a UE Group 212 including UE 301 and UE 202; a UE Group 214 including UE 203 and UE 204; and a UE Group 216 including UE 206 and UE 207. In various embodiments, UE 201 and UE 202 can be grouped into UE Group 212 based on their proximity to each other; UE 203 and UE 204 can be grouped into UE Group 214 based on their proximity to each other; and UE 206 and UE 207 can be grouped into UE Group 216 based on their proximity to each other.

As discussed herein, the method provided by communication system 100 may include selecting a new master UE for each new UE group. As shown in FIG. 2C, UE 202 can be selected as a master UE for UE Group 212 and UE 201 may be a follower UE for the group; UE 204 can be selected as a master UE for UE Group 214 and UE 203 may be a follower UE for the group; and UE 207 can be selected as a master UE for UE Group 216 and UE 208 may be a follower UE for the group. Accordingly, in various embodiments, the method provided by communication system 100 can provide for dividing a large UE group (e.g., UE Group 210) into one or more smaller UE groups (e.g., UE Groups 212, 214 and 216) and selecting new masters for the groups in response to changing group dynamics, such as, for example a master UE (e.g., UE 205) leaving its group.

In some embodiments, it may not be possible to group certain UE in communication system 100 into a group because, at least in part, the UE may not be in proximity to other UE. As shown in FIG. 2C, UE 208 may not be in proximity to the other UE that were in UE Group 210; thus, UE 208 may be ungrouped following the exit of UE 205 from UE Group 210. In at least one embodiment, conventional service measurement techniques can be used for ungrouped UE in communication system 100. In some embodiments, cell radios in communication system 100 may be configured to track mobility events for UE in order to determine whether UE may be considered a high mobility UE or a low mobility UE in comparison to other UE in the system. In some embodiments, mobility (e.g., high or low) may be an additional factor taken into consideration when selecting a master UE for a group. In other embodiments, mobility may be an additional factor taken into consideration when grouping UE into one or more groups. In such embodiments, it may be beneficial to exclude high mobility UEs from groups, as these UE may cause frequent master UE re-selections as the UE transitions between different groups thereby changing the organization of such groups.

Turning to FIG. 3, FIG. 3 is a simplified flow diagram illustrating example operations 300 associated with grouping UE into one or more UE groups in accordance with one potential embodiment of communication system 100. In one or more embodiments, operations 300 can be performed by a given small cell radio (e.g., any small cell radio 130*a*-130*b*) or a given macro cell radio (e.g., any macro cell radio 140*a*-140*b*) that may be serving one or more UE (e.g., UE 110*a*-110*f*) in order to facilitate grouping UE served by the cell radio into one or more groups and selecting a master UE for each group.

At any time, a given serving cell radio (e.g., small cell radio 130*a*) can group and/or re-group UE (e.g., UE 110*a*-110*f*) connected to the serving cell radio into one or more UE group(s). Accordingly, at 302, the operations can include determining an approximate location of UE(s) connected to the serving cell radio. In at least one embodiment, determining the location of each UE can include enabling intra-frequency measurement reporting for each UE served by the serving cell radio and triangulating the approximate location of each of the UE based on intra-frequency measurement information received from each of the UE for at least two intra-frequency neighboring cell radios.

At 304, the operations can include determining the proximity of each UE in relation to other UE connected to the serving cell radio based on the approximate location of each UE. In various embodiments, the operations at 304 can be used to determine a distribution of UEs within the coverage area of the cell radio as well as the proximity of each UE in relation to one another other within the coverage area. At 306, the operations can include grouping the UE into one or more UE groups based, at least in part, on the proximity of each UE in relation to other UE connected to the serving cell radio such that each UE group includes at least two UE in proximity to each other. At 308, the operations can include selecting, for each UE group, a master UE to provide feedback information for each UE group and the operations may end.

Turning to FIG. 4, FIG. 4 is a simplified flow diagram illustrating example operations 400 associated with selecting a master UE for a given UE group. In one or more embodiments, operations 400 can be performed by a given small cell radio (e.g., any small cell radio 130*a*-130*b*) or a given macro cell radio (e.g., any macro cell radio 140*a*-140*b*) that may be serving one or more UE (e.g. UE 110*a*-110*f*) in order to facilitate selecting a master UE for each group.

At any time, a given serving cell radio (e.g., small cell radio 130*a*) can group and/or re-group UE (e.g., UE 110*a*-110*f*) connected to the serving cell radio into one or more UE group(s) and can select a master UE for each group. Thus, it is assumed that the approximate location and proximity of each UE in relation to each other is known for operations 400 for each UE connected to the serving cell radio. For selecting a master UE for a particular UE group, the operations can begin at 402 in which the serving cell radio can determine a data rate for each UE in the particular group. In various embodiments, determining the data rate for each UE in the particular UE group can include one or more of: evaluating a number of quality of service (QoS) class identifiers (QCIs) for configured for each UE in which the number of QCIs configured for each UE is associated with its data rate; determining the data rate for each UE based on an assessment of one or more protocol layers of the serving cell radio; and/or inferring channel conditions for each UE based on a modulation and coding scheme (MCS) and/or a number of physical resource blocks allocated to each UE.

At 404, the operations can include comparing the data rate for each UE to determine one or more candidate UE that can be selected as the master UE. Each corresponding candidate UE may have a corresponding data rate that is lower in comparison to other UE in the UE group. At 406, the operations can include determining a number of UE in the UE group. At 408, the operations can include determining if there are more than two UE in the UE group. If there are not more than two UE in the UE group, the operations can continue to 410 in which the master UE can be selected from the candidate UE that has the lowest data rate and the operations may end. If there are more than two UE in the UE group, the operations can continue to 412 in which the master UE can be selected from the candidate UE that has the lowest data rate and that is located at an approximate geographical center of the UE group, as determined using the approximate location of each UE determined via intra-frequency measurement reporting. At 414, the operations can include assigning an ID to the UE group and at 416 the operations can include relating each UE in the UE group to the ID for the UE group and the operations may end.

Figure 5:
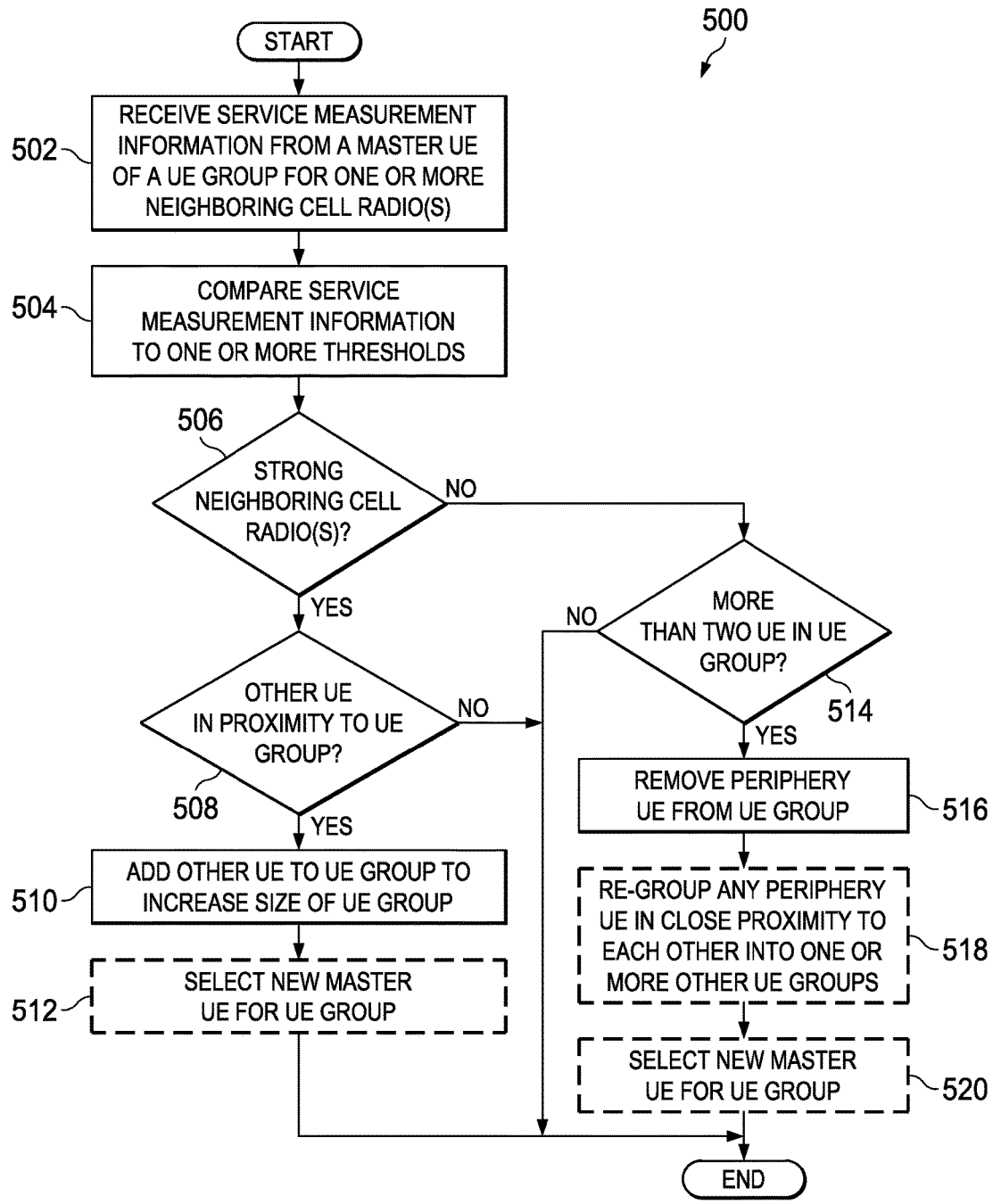
FIG. 5 is a simplified flow diagram illustrating example operations associated with adjusting a size of a user equipment group in accordance with one potential embodiment of the communication system.

Turning to FIG. 5, FIG. 5 is a simplified flow diagram illustrating example operations 500 associated with adjusting a size of a UE group in accordance with one potential embodiment of communication system 100. In various embodiments, the size of a given UE group can be increased or decreased to manage performance of the UE group. As discussed herein, large UE groups can lead to increased system performance as signaling overhead can be reduced when densely populated UE in an area can benefit from service measurements of a single master UE providing feedback information for the group as a whole.

In one or more embodiments, operations 500 can be performed by a given small cell radio (e.g., any small cell radio 130*a*-130*b*) or a given macro cell radio (e.g., any macro cell radio 140*a*-140*b*) that may be serving one or more UE in order to facilitate grouping UE served by the cell radio into one or more groups and selecting a master UE for each group. At any time, a given serving cell radio (e.g., small cell radio 130*a*) can adjust the size of a UE group in order to manage performance of the group for service hand-outs. Accordingly, at 502, the operations can include receiving, by the serving cell radio, service measurement information from a master UE of a UE group for one or more neighboring cell radio(s). In various embodiments, the service measurement information can include target inter-frequency and/or inter-RAT measurements for an intended measurement quantity (e.g., RSRP, RSRQ, RSCP, CPICH Ec/Io, etc.) for one or more neighboring cell radio(s), which may provide services not supported by the serving cell radio.

At 504, the operations can include comparing the service measurement information to one or more thresholds (e.g., signal strength thresholds) in order to determine the signal strength of the one or more neighboring cell radio(s) as measured by the master UE. At 506, the operations can include determining if the master UE is near one or more strong neighboring cell radio(s), based on the comparison at 504 to the one or more thresholds. If it is determined that the master UE is near at least one strong neighboring cell radio, the operations can include determining if there are other UE in proximity to the UE group (e.g., using intra-frequency triangulation, etc.) at 508. If it is determined at 508 that no other UE are in proximity to the UE group, the operations may end. However, if it is determined that there are other UE in proximity to the group, the operations can include adding the other UE to the UE group at 510 to increase the size of the UE group. In some embodiments, the operations can include selecting, at 512, a new master UE for the group using one or more of the master UE selection techniques described herein in the present disclosure.

Recalling the comparison at 504, if it subsequently determined at 506 that there are no strong neighboring cell radio(s) (e.g., they are weak neighbor(s)) near the master UE for the UE group, the operations can include determining, at 514, if there are more than two UE in the UE group. Recall, a UE group should include at least two UE. If it is determine that there are not more than two UE in the group, the operations may end. However, if it is determined that there are more than two UE in the group, the operations can include removing one or more periphery UE from the UE group at 516 and the operations may end. In various embodiments, periphery UE can be determined using the location information for each UE and determining UE that are farthest away from the location of the master UE for the UE group.

In some embodiments, after removing one or more periphery UE from the UE group, the operations can include, at 518, re-grouping any of the periphery UE that may be in proximity to each other into one or more other UE groups using one or more of the grouping techniques described herein in the present disclosure. In some embodiments, after removing one or more periphery UE from the UE group, the operations can include, at 520, selecting a new master UE for the UE group using one or more of the master UE selection techniques described herein.

Turning to FIG. 6, FIG. 6 is a simplified flow diagram illustrating example operations 600 associated with facilitating service hand-outs for UE using UE groups in accordance with one potential embodiment of communication system 100. In one or more embodiments, operations 600 can be performed by a given small cell radio (e.g., any small cell radio 130a-130b) or a given macro cell radio (e.g., any macro cell radio 140a-140b) that may be serving one or more UE in order to facilitate service hand-outs for UE served by the cell radio. At any time, a given serving cell radio (e.g., small cell radio 130a) can group and/or re-group UE (e.g., UE 110a-110f) connected to the serving cell radio into one or more UE group(s); can select a master UE for each group, and can facilitate service hand-outs for UE of each group.

Accordingly, operations can begin at 602 and can include grouping UE served by a serving cell radio into one or more UE groups based, at least in part, on an approximate location of each UE and a proximity of each UE in relation to each other. The serving cell radio can provide a first service to each UE connected to the serving cell radio. At 604, the operations can include selecting a master UE for each UE group using one or more of the techniques described herein in the present disclosure. At 606, the operations can include enabling measurement reporting for each master UE for a target inter-frequency and/or inter-RAT measurement for service hand-outs.

At 608, the operations can include receiving, by the serving cell radio, service measurement information from the master UE selected for each UE group. In various embodiments, the service information can be associated with one or more neighboring cell radios, which may support services not supported by the serving cell radio. In various embodiments, the service measurement information can include the target inter-frequency and/or inter-RAT measurements for an intended measurement quantity (e.g., RSRP, RSRQ, RSCP, CPICH Ec/Io, etc.) for the one or more neighboring cell radios.

At any time, any UE in any UE group may request a service not supported by the serving cell radio. Accordingly, at 610, the operations can include receiving a service request, from a particular UE in a particular UE group, for a service not supported by the serving cell radio. At 612, the operations can include selecting a neighboring cell radio for service hand-out of the particular UE based, at least in part, on service measurement information received from a particular master UE associated with the particular UE group and the operations may end. In various embodiments, service hand-out for the particular UE can then continue according to 3GPP standards for the selected neighboring cell radio.

In various embodiments, the operations for selecting a neighboring cell radio for service-handout can include evaluating the service measurement information associated with the service (e.g., intended measurement quantity for target frequency and/or RAT type that associated with the service) to determine the best neighboring cell radio (e.g., neighboring cell radio having the highest/strongest measurement quantity) to receive the service hand-out for the particular UE. Recall, the service measurement information can include a corresponding measurement quantity and cell ID for each neighboring cell radio supporting the target frequency and/or RAT type. Accordingly, the method provided by communication system 100 can facilitate service hand-outs for UE using UE groups.

Figure 7B:
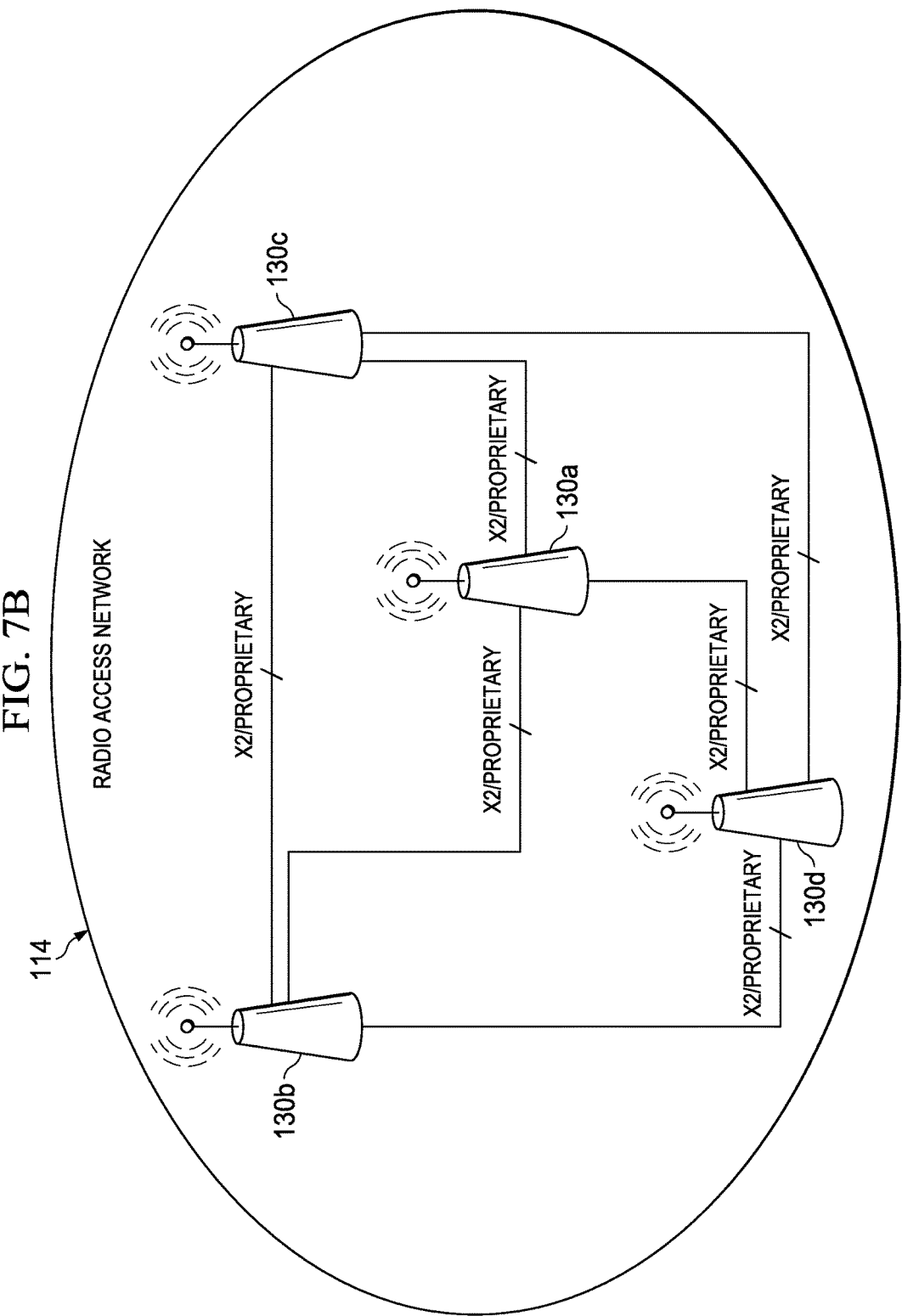

Turning to FIGS. 7A-7B, FIGS. 7A-7B are simplified block diagrams illustrating additional details associated with one potential embodiment of communication system 100. In some cases, communication system 100 may include a Self-Organizing Network (SON) server 702 as shown in FIG. 7A. FIG. 7A also includes UE 110p-110u, RAN 114, service network 116, mobile core network 118, IP network 120 and small cell radios 130a-130d. UE 110p-110r may be served by small cell radio 130a (e.g., having a connection established therewith) within its coverage area and can grouped together in a UE Group 3 using any of the techniques described herein. UE 110s-110u may be served by small cell radio 130c within its coverage area and can be grouped together in a UE group 4 using any of the techniques described herein. Macro cell radios 140a-140b are not shown in FIG. 7A in order to illustrate other features of communication system 100. Referring briefly to FIG. 7B, FIG. 7B illustrates that each small cell radio 130a-130d within RAN 114 can be logically interconnected to each other via an X2 interface, as provided in 3GPP standards, or a proprietary interface (e.g., vendor specific, operator specific, etc.).

Turning back to FIG. 7A, SON server 702 can interface with any of small cell radio 130a-130b, small cell gateway 132, small cell management system 134, and any other element in communication system 100 (e.g., macro cell radio(s), RNC(s), etc.) via service network 116 and mobile core network 118 to facilitate various functions and/or operations as described herein. In some embodiments, SON server 702 can be configured to monitor and optimize resources for UE served by small cell radios 130a-130d to increase the overall efficiency of communication system 100. In general, SON server 702 may have has a system-wide view of communication system 100, which may enable SON server 702 to intelligently provision resources among small cell radios 130a-130d to increase the overall efficiency of communication system 100. In various embodiments, SON server 702 can be implemented in a centralized SON (cSON) architecture within or across service network 116 and/or mobile core network 118 or can be implemented in a distributed SON (dSON) architecture across cell radios (e.g., small cell and/or macro cell radio(s)) in communication system 100.

Before detailing various operational aspects of FIG. 7A, it is important to understand common characteristics of small cell radio deployments, as generally provided in commercial architectures. The following foundation is offered earnestly for teaching purposes only and, therefore should not be construed in any way to limit the broad teachings of the present disclosure. In the radio resource environment in which radio resources are highly scarce, it is not uncommon to see co-channel (e.g., intra-frequency) deployment of small cell radios. Given their ad-hoc nature of small cell radio deployment there could be small cell radios having coverage areas which could overlap with each other. In a dense deployment of small cell radios, there will likely be more than two small cell radios having overlapping coverage areas. In such cases, it can become a challenge to manage interference between small cell radios.

One way to manage interference can be to avoid transmission on radio resource blocks (e.g., PRBs) used by adjacent cells. This is often made possible via X2 exchanges (e.g., via X2 interfaces as shown in FIG. 7B) between small cell radios in order to schedule coordinated transmissions between adjacent small cell radios. However, reducing transmission on all cell edge UEs between adjacent cells may not be needed in some cases as the interference sensed by a one neighbor may not same as that of the other. Another way to manage interference may be through a cloud-based RAN (C-RAN) architecture in which scheduling decisions are passed to cell radios via a backhaul network connecting the cell radios to the C-RAN control elements. However, C-RAN architectures typically have high backhaul loads, which can lead to increased latency in for scheduling resources at cell radios.

In at least one embodiment, communication system 100 can be configured to provide a method to optimize use of radio resources in cases in which small cell radios (e.g., small cell radio 130a and 130c) may have overlapping coverage areas. In general, the method provided by communication system 100 may provide for using UE groups or clusters to provide information on UE density in and/or around a given cell radio so intelligent radio resource management can be performed between adjacent cell radios. In various embodiments, the method provided by communication system 100 can improve overall efficiency of the network through interference management, radio resource management and/or handover management for adjacent cell radios. Although the method described herein is described with respect to LTE small cell radios, it should be understood that the method is not restricted to LTE deployments and could be extended to UMTS deployments, Wi-Fi deployments or the like within the scope of the present disclosure.

During operation, in at least one embodiment, small cell radio 130a may group together UE 110p-110r in a logical grouping, for example, UE Group 3. Small cell radio 130a may assign a unique ID to identify UE Group 3 within the context of small cell radio 130a and may create a logical grouping of UE IDs (e.g., IMSIs, TMSIs, etc.) identifying UE 110p-110r as members of UE Group 3. In various embodiments, the grouping can be based on intra-frequency measurement reporting, triangulation, etc., as described herein, in order to determine the proximity of UE 110p-110r in relation to each other. In a similar manner, small cell radio 130c may group together UE 110s-110u in a logical grouping, for example UE Group 4, and small cell radio 130c may assign a unique ID to identify UE Group 4 within the context of small cell radio 130c and may create a logical grouping of UE IDs identifying UE 110p-110r as members of UE Group 4.

In various embodiments, the size of a UE group can be adjusted based on the intended use of the group. For example, if a UE group is to be used for interference mitigation with the a neighboring cell radio, then groups of UE near the source cell radio could be of a large size and groups of UE far away from the source cell radio could be of a smaller size. In certain embodiments, using larger UE groups for cell interior UE (e.g., near the source cell radio) may help to reduce unnecessary communication between the source cell radio and SON server 702 regarding the allocation of resources for cell interior UE, which may not need as much or any interference management as compared to cell edge UE.

In some embodiments, UE group size can also be defined based on how fine a control is needed for a UE group. For example, if broad, 'blanket' changes are desired for a UE group, then forming a large UE group may be beneficial to apply the changes to the group in an efficient manner. A group of cell interior UE may be one example in which forming large UE group may be beneficial. However, if more fine control changes are desired for a group, such as, for example, for interference mitigation techniques, then forming smaller UE groups may be beneficial. For example, various cell edge UE may be grouped together into small groups depending on the interferers seen (e.g., measured) by UE in the group in order to provide fine-tuned interference management for the different groups. Forming a large group of potentially disparate cell edge UE, which might be near different interferers, could lead to suboptimal interference mitigation management and/or reduced uplink throughput for UE of the large group as coordinating resources may become increasingly difficult and/or inefficient as the number of UE and/or potential interferers increases. Using smaller groups for cell edge UE, in contrast, may allow SON server 702 to more accurately pinpoint the location of interferer(s) for a given small UE group and thereby only issue instructions pertaining to that given UE group for managing the interference for the interferer(s). In some embodiments, as discussed above, UE group size can be adjusted based on group performance for successful service handouts.

In contrast to master UE selection for service handout operations, master UE selection for radio resource management, interference management and/or handover management can be streamlined by removing data rate considerations for master UE selection. In various embodiments, a master UE can be selected for a UE Group based on either being at an approximate geographical center of a UE group (e.g., for groups having more than two UE) or based on proximity and/or signal strength in relation to a serving cell radio (e.g., for groups having only two UE). In at least one embodiment, UE 110$p$ can be selected by small cell radio 130$a$ as the master UE ($UE_{MASTER(3)}$) for UE Group 3 based on being at the approximate geographical center of UE Group 3. In at least one embodiment, UE 110$s$ can be selected by small cell radio 130$c$ as the master UE ($UE_{MASTER(4)}$) for UE Group 4 based on being at the approximate geographical center of UE Group 4.

During operation, a master UE for a given UE group (e.g., master UE 110$p$ for UE Group 3 and/or master UE 110$s$ for UE Group 4), may periodically provide updated position information (e.g., feedback information) to its serving cell radio, given as one or more sets of {PCI, signal strength} pairs for neighboring cell radios measured/sensed by the master UE. The source cell radio (e.g., small cell radio 130$a$, 130$c$) may communicate the position information, the number of UEs in a given group (e.g., three for UE Group 3 and three for UE Group 4), the ID for the UE group and, in certain embodiments, additional information related to the UE group to SON server 702. In various embodiments, the position information, size information and/or additional information can be used by SON server 702 to determine, at a high level, resource utilization for a given UE group.

In some embodiments, the additional information can vary depending on the management implementation (e.g., interference mitigation, radio resource, handover) at SON server 702. For example, if SON server 702 is managing interference mitigation between adjacent cell radios, then it may be interested to know the power headroom available at the master UE (e.g., difference between the maximum transmit power and the current used transmit power for the master UE) for each UE group and/or the average data rate served to UE group(s). In some embodiments, average data rate (e.g., average throughput rate) can also be used to provide for interference mitigation management for UE groups. In still some embodiments, an average uplink (e.g., transmission from UE towards serving small cell radio) Signal to Interference Plus Noise Ratio (SINR) for UE of a UE group can be included in the additional information. In still some embodiments, downlink Block Error Rate (BLER) can be included in the additional information. Per 3GPP standards, downlink BLER is typically determined by dividing the number of downlink PRBs for a given UE that have resulted in an error (e.g., a Cyclic Redundancy Check error) by the total number of downlink PRBs that have been communicated to the UE.

Consider a case in which SON server 702 determines that two UE groups in adjacent cells are close to each other (e.g., UE Group 3 served by cell radio 130$a$ and UE Group 4 served by cell radio 130$c$) based on messages received from the respective cell radios 130$a$, 130$c$ serving UE Group 3 and UE Group 4, respectively. In one embodiment, based on such a determination, SON server 702 could instruct both the small cell radios 130$a$, 130$c$ to schedule UE in groups lying close to each other (e.g., UE 110$p$-110$r$ in Group 3 and UE 110$s$-110$u$ in Group 4) at orthogonal resources (e.g., at different PRBs) to avoid overlap in both the uplink and downlink. In some embodiments, SON server 702 may provide such instruction by communicating to each small cell radio 130$a$, 130$c$ a command including the respective group ID (e.g., ID for UE Group 3 and ID for UE Group 4) for each UE group lying close to each other. Upon receiving such instruction, in some embodiments, small cell radio 130$a$ and small cell radio 130$c$ may communicate with each other via the X2 or proprietary interface in order to schedule orthogonal resources for UE in each UE group.

For example, in some embodiments, small cell radios 130$a$-130$d$ may be configured to utilize Vendor Specific Attributes (VSAs), vendor specific Attribute Value Pairs (AVPs), vendor specific Information Elements (IEs), combinations thereof or the like in order to coordinate resources via the X2 or proprietary interface using one or more UE group resource coordination messages that can exchanged between the small cell radios. In various embodiments, the UE group resource coordination messages can be configured (e.g., via VSAs, AVPs, IEs, etc.) to carry group ID information, resource block information, or other resource coordination information to facilitate UE group resource coordination in order to mitigate interference between UE groups.

In some embodiments, SON server 702 could also divide available PRBs into groups or sets of PRBs and could instruct each small cell radio regarding which set of PRBs it may or may not allocate/schedule for UE groups served thereby. For example, SON server could 1) divide available PRBs into groups X and Y; 2) could instruct small cell radio 130$a$ to not schedule UE 110$p$-110$r$ on PRBs belonging to group X; and 3) could instruct small cell radio 130$c$ to not schedule UE 110$s$-110$u$ on PRBs belonging to group Y. Accordingly, in some embodiments, SON server 702 could provide instructions for interference mitigation management operations that may not result in X2 or proprietary interface exchanges between cell radios, but rather would provide small cell radios directly with the PRBs on which certain UE group(s) can be scheduled. In such embodiments, communication system 100 may provide for a wholly centralized method of interference mitigation management between cell radios. In various embodiments, SON server 702 may update the division of PRBs between UE groups upon reassessing interference between the groups.

Consider another case in which SON server 702 determines that a UE group served by one cell radio may be small but may still be generating interference to a neighboring UE group served by another cell radio merely by virtue of the proximity of the small UE group in relation to the neighboring UE group. In one embodiment, SON server 702 may determine to handover UE within the small UE group to the neighboring cell radio in order to manage interference between the neighboring cell radios. In some embodiments, additional information communicated to SON server 702 can include capacity information for each small cell radio and SON server 702 can consider any trade-off between loss of capacity (e.g., UE/cell throughput) due to interference in determining whether to initiate handover for UE in such situations.

In some embodiments, capacity information can be determined from PRB usage by small cell radios 130$a$-130$d$. For example, SON server 702 can determine PRB usage for a particular small cell radio in relation to total available PRBs for the system in order to determine capacity/capacity limitations for the particular small cell. In some embodiments, such information can be used by a network and/or system operator to determine if additional or fewer small cell radios should be deployed in a geographical area.

In some embodiments, position information received from a master UE of a given UE group can be used by SON server 702 to trigger Automatic Neighbor Relation (ANR) functionality for a given small cell radio serving the UE group. By triggering ANR functionality, the small cell radio could determine neighboring cell radios, which could be added to a neighbor list for the small cell radio, used to configure/update neighbor relation information for the system, etc. Typically, ANR operations are performed periodically by small cell radios tasking a particular UE to provide neighbor measurement information. However, simple periodic ANR functionality can be inefficient, as ANR operations may be needed less often in relatively static deployment environments. Further, ANR operations can sacrifice capacity/throughput for UE tasked with performing neighbor measurements. However, in various embodiments, SON server 702 can use position information and/or capacity information for UE groups to select a particular master UE for a particular UE group served by a particular small cell radio that may be near a geographic area of interest and/or available (e.g., having reduced loading) to provide ANR information to SON server 702 (via the serving cell radio). SON server 702 can use the information to configure/update neighbor relation information for communication system 100, for the particular small cell radio, for neighboring small cell radios, combinations thereof or the like.

In various embodiments, the method provided by communication system 100 for various management implementations can include, but not be limited to, using UE grouping to minimize the overall backhaul load unlike those that are typically found for C-RAN architectures and/or minimizing the impact to existing small cell radio infrastructure. For example, existing X2 interfaces or proprietary interfaces can be exploited to coordinate resources between small cell radios, while the radios can be configured with Application Programming Interfaces (APIs) in order to interface with the SON server. Further by targeting UE groups for coordinated interference mitigation, more precise control over resources can be achieved over traditional coordinated X2 interference mitigation coordination. Additionally, the method provided by communication system 100 using SON server 702 may, in some embodiments, provide the ability to determine a UE group causing interference to a neighboring group in order to deal appropriately (e.g. initiating handover, etc.) with the interfering UE group rather than merely lowering the data rate of the neighboring group which is complaining of the high interference. Accordingly, in various embodiments, the method provided by communication system 100 using SON server 702 may provide for the efficient management of co-channel small cell radio deployments to improve UE/cell throughput, assist in interference management and/or improve key performance indicators (KPIs) such as handover success rate.

Turning to FIG. 8, FIG. 8 is a simplified flow diagram illustrating other operations 800 associated with master UE selection in accordance with one potential embodiment of communication system 100. More specifically, operations 800 may be associated with selecting a master UE for a UE group for purposes other than performing service handovers using UE groups. In some embodiments, operations 800 can be performed after selecting UE in to one or more UE groups using one or more techniques as described herein (e.g., via operations 302, 304 and 306 as shown in FIG. 3). Accordingly, operations 800 can begin at 802 in which a given small cell radio (e.g., small cell radio 130a) can determine a number of UE in a particular UE group. At 804, the operations can include determining if there are more than to UE in the UE group.

If there are not more than two UE in the UE group, the operations can continue to 806 in which the master UE can be selected for the UE group based on proximity of the each UE in the UE group in relation to the source cell radio. In some embodiments, a master UE can be selected for a UE group based on being closest to the source small cell radio. If there are more than two UE in the UE group, the operations can continue to 806 in which the master UE can be selected for the UE group that is located at an approximate geographical center of the UE group, as determined using the approximate location of each UE determined via intra-frequency measurement reporting. At 810, the operations can include assigning an ID to the UE group and at 812 the operations can include relating each UE in the UE group to the ID for the UE group and the operations may end.

Turning to FIG. 9, FIG. 9 is a simplified flow diagram illustrating example operations 900 associated with SON server 702 in accordance with one potential embodiment of communication system 100. More specifically, operations 900 may be associated with interactions between small cell radios (e.g., any of small cell radios 130a-130d) and SON server 702. In various embodiments, operations 900 assume that SON server 702 has been configured to provide certain management for small cell radios and/or UE within communication system 100 (e.g., radio resource management, interference mitigation management, etc.). Further, operations 900 assume that various UE served by each small cell radio in the system have grouped UE into one or more UE groups and have selected a master UE for each corresponding UE group.

At 902, the operations can include receiving, by each small cell radio, position information from each master UE of each UE group served by each small cell radio. In various embodiments, the position information can be in the form of {cell ID, signal strength}. Depending on implementation (e.g., LTE, UMTS, etc.), cell ID can be PCI, PSC or some other cell ID in various embodiments. In various embodiments, signal strength can be represented as RSRP, RSRQ, RSCP, CPICH Ec/Io, RSSI or other signal strength indication.

At 904, the operations can include communicating, by each small cell radio, UE group information to SON server 702. In various embodiments, UE group information for each UE group can include the position information received from the master UE of the group, the number of UE in the group, the ID for the UE group and/or any additional information (e.g., power headroom, throughput information, etc.).

At 906, the operations can include determining, by SON server 702, management instructions associated with one or more operations to be performed by each small cell radio based on the management configuration of SON server 702 (e.g., radio resource management, interference mitigation management, etc.) and UE group in formation received from the small cell radios. At 908, the operations can include communicating the management instructions to one or more of the small cell radios (e.g., only select small cell radios may receive the instructions based on the position and/or interference between UE groups served by each small cell radio). At 910, the operations can include performing, at the one or more small cell radios, the operations associated with the instructions communicated from SON server 702 and operations 900 may end.

In various embodiments, instructions communicated to one or more small cell radios can be associated with performing coordinated resource scheduling operations for UE groups between adjacent small cell radios (e.g., via X2 or proprietary interface exchanges), adjusting the number of resources to be allocated to UE groups, initiating handover operations for UE groups between adjacent small cell radios, combinations thereof or the like.

Figure 10C:
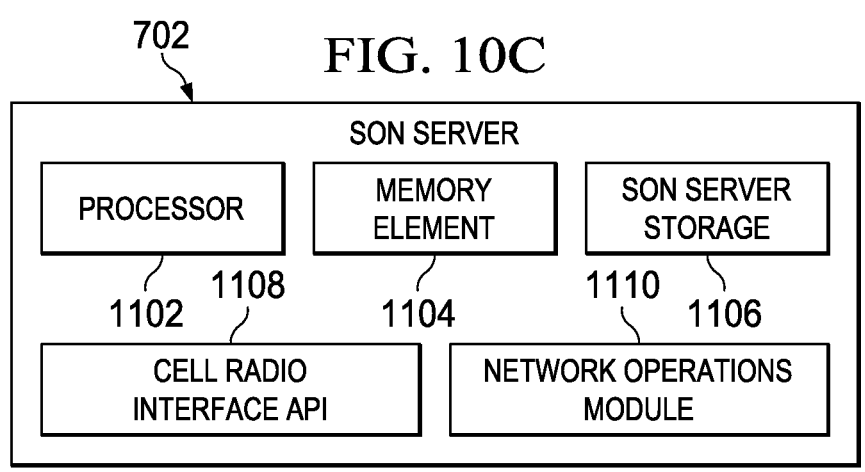

Turning to FIGS. 10A-10C, FIGS. 10A-10C are simplified block diagrams illustrating example details of various elements that can be associated with communication system 100 in accordance with one or more embodiments.

Referring to FIG. 10A, FIG. 10A is a simplified block diagram illustrating example details that can be associated with small cell radio 130*a* in accordance with one embodiment of communication system 100. It should be understood that features of small cell radio 130*a* can be configured for any small cell radio in communication system 100, including small cell radios 130*b*-130*d*. As shown in FIG. 10A, small cell radio 130*a* can, in one or more embodiments, include at least one processor 1002, at least one memory element 1004, a small cell radio storage 1006, a service hand-out management module 1008, a transmitter 1010, a receiver 1012 and one or more antennas 1014. In some embodiments, small cell radio 130*a* can additionally include a SON interface API 1040 and a SON operations module 1042, each of which can be configured to perform various operations, as described herein, related to interactions with SON server 702 and/or performing operations as instructed by SON server 702. In at least one embodiment, at least one processor 1002 is a hardware processor configured to execute various tasks, operations and/or functions of small cell radio 130*a* as described herein and memory element 1004 is configured to store data associated with small cell radio 130*a*. In various embodiments, service hand-out management module 1008 can be configured to perform various operations as described herein to facilitate service hand-outs for UE using UE groups. In various embodiments, small cell radio storage 1006 can be configured to store information associated with various operations as described herein.

In various embodiments, small cell radio storage 1006 can be configured to store service information that can be used for service hand-outs including, but not limited to, target service frequency (or frequencies) and/or target RAT type(s) for one or more services supported within communication system 100, intended measurement quantities for each target service frequency/frequencies and/or target RAT type(s).

In various embodiments, small cell radio storage 1006 can be configured to store grouping information of one or more UE groups formed by small cell radio including, but of limited to, identifying information for each UE within each group (e.g., IMSI, or any other local or global identity), location information for each UE in each group, master UE identification for each UE within each group, follower UE identification for each UE within each group, feedback information (e.g., service measurement report(s), etc.) for each master UE for each group, combinations thereof or the like.

In various embodiments, small cell radio storage 1006 can be configured to store coverage area related information for small cell radio 130*a* including, but not limited to, one or more regions (e.g., identified using GPS coordinates, a coverage map configured by a network operator and/or service provider, combinations thereof or the like) within its coverage area that may be flagged as high mobility areas, regions having rapidly changing conditions, regions having high interference (e.g., with structures and/or neighboring cell radios), combinations thereof or the like.

As shown in FIG. 10A, transmitter 1010 can include a transmitter PDCP layer 1020, a transmitter RLC layer 1022, a transmitter MAC layer 1024 and a transmitter PHY layer 1026. Transmitter MAC layer 1024 can include a transmitter buffer 1028. Receiver 1012 can include a receiver PDCP layer 1030, a receiver RLC layer 1032, a receiver MAC layer 1034 and a receiver PHY layer 1036. Receiver MAC layer 1034 can include a receiver buffer 1038. Transmitter 1010 can be associated with downlink data that may be transmitted to one or more UE and receiver 1012 can be associated with uplink data that may be received from one or more UE. As discussed herein, in at least one embodiment, a data rate for each UE (e.g., UE 110*a*-110*f*) served by a given serving cell radio (e.g., small cell radio 130*a*) can be determined based on data rate at transmitter PDCP layer 1020 for downlink data (e.g., data to be transmitted to UE) and/or buffer occupancy for uplink data (e.g., data received from UE) within receiver buffer 1038 for receive MAC layer 1034 in order to determine one or more candidate UE having low data rates in comparison to other UE of a given UE group for possible selection as a master UE for the given UE group.

Referring to FIG. 10B, FIG. 10B is a simplified block diagram illustrating example details that can be associated with macro cell radio 140*a* in accordance with one embodiment of communication system 100. It should be understood that features of macro cell radio 140*a* can be configured for any macro cell radio in communication system 100, including macro cell radio 140*b*. Although the discussions provided herein with regard to service hand-outs have focused on service hand-outs from small cell radios, it should be understood that service hand-outs can also be facilitated using macro cell radios according to the embodiments discussed herein.

As shown in FIG. 10B, macro cell radio 140*a* can, in one or more embodiments, include at least one processor 1052, at least one memory element 1054, a macro cell radio storage 1056, a service hand-out management module 1058, a transmitter 1060, a receiver 1062 and one or more antennas 1064. In some embodiments, macro cell radio 140*a* can additionally include a SON interface API 1090 and a SON operations module 1092, each of which can be configured to perform various operations related to interactions with SON server 702 and/or performing operations as instructed by SON server 702. In at least one embodiment, at least one processor 1052 is a hardware processor configured to execute various tasks, operations and/or functions of macro cell radio 140*a* as described herein and memory element 1054 is configured to store data associated with macro cell radio 140*a*. In various embodiments, service hand-out management module 1058 can be configured to perform various operations as described herein to facilitate service hand-outs for UE using UE groups. In various embodiments, macro cell radio storage 1056 can be configured to store information associated with various operations as described herein.

Transmitter 1060 can include a transmitter PDCP layer 1070, a transmitter RLC layer 1072, a transmitter MAC layer 1074 and a transmitter PHY layer 1076. Transmitter MAC layer 1074 can include a transmitter buffer 1078. Receiver 1062 can include a receiver PDCP layer 1080, a receiver RLC layer 1082, a receiver MAC layer 1084 and a receiver PHY layer 1086. Receiver MAC layer 1084 can include a receiver buffer 1088. Transmitter 1060 can be associated with downlink data that may be transmitted to one or more UE and receiver 1062 can be associated with uplink data that may be received from one or more UE. Transmitter 1060 and receiver 1062 and the corresponding elements included in each, can perform similar operations as those described for small cell radio 130*a*.

Turning to FIG. 10C, FIG. 10C is a simplified block diagram illustrating example details that can be associated with SON server 702 in accordance with one embodiment of communication system 100. In various embodiments, SON server 702 can include at least one processor 1102, at least one memory element 1104, a SON server storage 1106, a cell radio interface API 1108, a macro cell radio interface API 1110 and a network operations module 1112. In at least one embodiment, at least one processor 1102 is a hardware processor configured to execute various tasks, operations and/or functions of SON server 702, as described herein, and memory element 1104 is configured to store data associated with SON server 702. In various embodiments, cell radio interface API 1108 is configured to interface with one or more cell radios (e.g., small cell radios 130*a*-130*d* and/or macro cell radios 140*a*-140*b*), for example, to receive UE group information from the small cell radios and/or to communicate instructions for one or more operations associated with radio resource management operations to be carried out by the small cell radios. In various embodiments, network operations module 1110 can be configured to perform various operations as described herein to facilitate determining one or more instructions to communicate to cell radios in order to carry out one or more radio resource management operations (e.g., for resource management alone, interference mitigation management, etc.).

In regards to the internal structure associated with communication system 100, each of UE 110*a*-110*f*, UE 110*p*-110*u*, other small cell radios 130*b*-130*d*, other macro cell radio 140*b*, small cell gateway 132, small cell management system 134 and RNC 142 may each also include a respective at least one processor, a respective at least one memory element and/or a respective storage. Hence, appropriate software, hardware and/or algorithms are being provisioned in UE 110*a*-110*f* and 110*p*-110*u*, small cell radios 130*a*-130*d*, macro cell radios 140*a*-140*b*, small cell gateway 132, small cell management system 134, SON server 702 (e.g., for such implementations) and RNC 142 (e.g., for 3G deployments) in order to facilitate service hand-outs for UE using UE groups and/or to facilitate radio resource management (e.g., for resource management alone, interference mitigation management, etc.) in a network environment of communication system 100. Note that in certain examples, certain storage (e.g., for storing information associated with operations described herein in one or more databases, etc.) can be consolidated memory elements (or vice versa), or the storage can overlap/exist in any other suitable manner.

In one example implementation, UE 110*a*-110*f*, small cell radios 130*a*-130*d*, macro cell radios 140*a*-140*b*, small cell gateway 132, small cell management system 134, SON server 702 and RNC 142 are network elements, which are meant to encompass network appliances, servers, routers, switches, gateways, bridges, loadbalancers, firewalls, processors, modules, or any other suitable device, component, element, or object, which may be operable to exchange information that facilitates or otherwise helps to facilitate service hand-outs using UE groups (e.g., for networks such as those illustrated in FIGS. 1A and 1B) and/or to facilitate radio resource management (e.g., for networks such as those illustrated in FIG. 7A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 110*a*-110*f*, small cell radios 130*a*-130*d*, macro cell radios 140*a*-140*b*, small cell gateway 132, small cell management system 134, SON server 702 and RNC 142 (e.g., for 3G deployments) may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 110*a*-110*f*, small cell radios 130*a*-130*d*, macro cell radios 140*a*-140*b*, small cell gateway 132, small cell management system 134, SON server 702 and RNC 142 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the functions as outlined herein associated with providing service hand-outs using UE groups and/or associated with radio resource management may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 10A-10C] can store data used for the operations described herein. This includes the memory elements being able to store software, logic, code, or processor instructions that are executed to carry out the activities described herein. A processor can execute any type of instructions associated with the data to achieve the operations detailed herein. In one example, a processor can include multiple processing cores, each capable of performing operations in a parallel or serial manner to carry out activities described herein. In another example, the processors [as shown in FIGS. 10A-10C] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'certain embodiment', 'an embodiment', 'another embodiment', 'some embodiments', 'various embodiments', 'other embodiments', 'certain embodiments', 'alternative embodiment', and the like are intended to mean that any such features are included in one or more embodiments of the present disclosure, but may or may not necessarily be combined in the same embodiments. Note also that a module as used herein in this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
grouping a plurality of user equipment served by a serving cell radio into one or more groups based on an approximate location of each of the plurality of user equipment and a proximity of each of the plurality of user equipment in relation to each other, the serving cell radio providing a first service to the plurality of user equipment, wherein the grouping further comprises triangulating the approximate location of each of the plurality of user equipment based on intra-frequency measurement information received from each of the plurality of user equipment for at least two intra-frequency neighboring cell radios of each of the plurality of user equipment served by the serving cell radio and determining the proximity of each of the user equipment in relation to each other for grouping at least two user equipment in close proximity to each other into a group;
selecting a master user equipment for each group;
receiving, from the master user equipment for each group, inter-frequency measurement information or inter-Radio Access Technology (RAT) measurement information associated with one or more neighboring cell radios;
receiving a first service request for a first user equipment of a particular group, wherein the first service request includes a request for a second service for the first user equipment and wherein the second service is not provided by the serving cell radio; and
selecting a particular neighboring cell radio for a service hand-out of the first user equipment based, at least in part, on the first service request and inter-frequency measurement information or inter-Radio Access Technology (RAT) measurement information received from a particular master user equipment for the particular group.

2. The method of claim 1, wherein grouping the plurality of user equipment served by the serving cell radio into one or more groups further comprises:
enabling intra-frequency measurement reporting for each user equipment served by the serving cell radio.

3. The method of claim 1, further comprising:
adjusting a size of a particular group of user equipment based on inter-frequency measurement information or inter-RAT measurement information received for a particular master user equipment for the particular group, wherein the adjusting includes.

4. The method of claim 3, wherein the adjusting includes:
increasing the size of the particular group if the inter-frequency measurement information or the inter-RAT measurement information indicates a strong neighboring cell radio; and
decreasing the size of the particular group if the inter-frequency measurement information or the inter-RAT measurement information indicates a weak neighboring cell radio.

5. The method of claim 1, wherein selecting a particular master user equipment for a particular group further comprises:
determining a data rate for each user equipment for the particular group based on at least one of:
evaluating a number of quality of service (QoS) class identifiers (QCIs) for each user equipment, wherein the number of QCIs for each user equipment is associated with the data rate for each user equipment; and determining the data rate for each user equipment based on an assessment of one or more protocol layers of the serving cell radio.

6. The method of claim 5, wherein selecting the particular master user equipment for the particular group further comprises:

comparing the data rate for each user equipment for the particular group to determine one or more candidate user equipment that can be selected as the particular master user equipment, wherein the one or more candidate user equipment have lower data rates in comparison to other user equipment of the particular group; and selecting the particular master user equipment from the one or more candidate user equipment, which has the lowest data rate.

7. The method of claim 6, wherein selecting the particular master user equipment for the particular group further comprises:

selecting the master user equipment from the candidate user equipment, which has the lowest data rate and that is located at an approximate center of the particular group.

8. The method of claim 1, wherein selecting a particular master user equipment for a particular group further comprises:

evaluating a modulation and coding scheme (MCS) order for each user equipment for the particular group to determine one or more candidate user equipment that can be selected as the master user equipment, wherein the MCS is associated with a communication channel condition between the serving cell radio and each user equipment for the particular group; and selecting the particular master user equipment from the one or more candidate user equipment, which has the highest order MCS.

9. The method of claim 8, wherein selecting the particular master user equipment for the particular group further comprises:

selecting the master user equipment from the one or more candidate user equipment, which has the highest order MCS and that is located at an approximate center of the particular group.

10. One or more non-transitory tangible media encoding logic that includes instructions for execution that when executed by a processor, is operable to perform operations comprising:

grouping a plurality of user equipment served by a serving cell radio into one or more groups based on an approximate location of each of the plurality of user equipment and a proximity of each of the plurality of user equipment in relation to each other, the serving cell radio providing a first service to the plurality of user equipment, wherein the grouping further comprises triangulating the approximate location of each of the plurality of user equipment based on intra-frequency measurement information received from each of the plurality of user equipment for at least two intra-frequency neighboring cell radios of each of the plurality of user equipment served by the serving cell radio and determining the proximity of each of the user equipment in relation to each other for grouping at least two user equipment in close proximity to each other into a group;

selecting a master user equipment for each group;

receiving, from the master user equipment for each group, inter-frequency measurement information or inter-Radio Access Technology (RAT) measurement information associated with one or more neighboring cell radios;

receiving a first service request for a first user equipment of a particular group, wherein the first service request includes a request for a second service for the first user equipment and wherein the second service is not provided by the serving cell radio; and selecting a particular neighboring cell radio for a service hand-out of the first user equipment based, at least in part, on the first service request and inter-frequency measurement information or inter-Radio Access Technology (RAT) measurement information received from a particular master user equipment for the particular group.

11. The media of claim 10, wherein grouping the plurality of user equipment served by the serving cell radio into one or more groups further comprises:

enabling intra-frequency measurement reporting for each user equipment served by the serving cell radio.

12. The media of claim 10, the operations further comprising:

adjusting a size of a particular group of user equipment based on inter-frequency measurement information or inter-RAT measurement information received for a particular master user equipment for the particular group, wherein the adjusting includes.

13. The media of claim 12, wherein the adjusting includes:

increasing the size of the particular group if the inter-frequency measurement information or the inter-RAT measurement information indicates a strong neighboring cell radio; and decreasing the size of the particular group if the inter-frequency measurement information or the inter-RAT measurement information indicates a weak neighboring cell radio.

14. The media of claim 10, wherein selecting a particular master user equipment for a particular group further comprises:

determining a data rate for each user equipment for the particular group based on at least one of:

evaluating a number of quality of service (QoS) class identifiers (QCIs) for each user equipment, wherein the number of QCIs for each user equipment is associated with the data rate for each user equipment; and determining the data rate for each user equipment based on an assessment of one or more protocol layers of the serving cell radio.

15. The media of claim 14, wherein selecting the particular master user equipment for the particular group further comprises:

comparing the data rate for each user equipment for the particular group to determine one or more candidate user equipment that can be selected as the particular master user equipment, wherein the one or more candidate user equipment have lower data rates in comparison to other user equipment of the particular group; and selecting the particular master user equipment from the one or more candidate user equipment, which has the lowest data rate.

16. The media of claim 15, wherein selecting the particular master user equipment for the particular group further comprises:
selecting the master user equipment from the candidate user equipment, which has the lowest data rate and that is located at an approximate center of the particular group.

17. An apparatus, comprising:
a memory element for storing data; and
a processor that executes instructions associated with the data, wherein the processor and the memory element cooperate such that the apparatus is configured for:
grouping a plurality of user equipment served by a serving cell radio into one or more groups based on an approximate location of each of the plurality of user equipment and a proximity of each of the plurality of user equipment in relation to each other, the serving cell radio providing a first service to the plurality of user equipment, wherein the grouping further comprises triangulating the approximate location of each of the plurality of user equipment based on intra-frequency measurement information received from each of the plurality of user equipment for at least two intra-frequency neighboring cell radios of each of the plurality of user equipment served by the serving cell radio and determining the proximity of each of the user equipment in relation to each other for grouping at least two user equipment in close proximity to each other into a group;
selecting a master user equipment for each group;
receiving, from the master user equipment for each group, inter-frequency measurement information or inter-Radio Access Technology (RAT) measurement information associated with one or more neighboring cell radios;
receiving a first service request for a first user equipment of a particular group, wherein the first service request includes a request for a second service for the first user equipment and wherein the second service is not provided by the serving cell radio; and
selecting a particular neighboring cell radio for a service hand-out of the first user equipment based, at least in part, on the first service request and inter-frequency measurement information or inter-Radio Access Technology (RAT) measurement information received from a particular master user equipment for the particular group.

18. The apparatus of claim 17, wherein grouping the plurality of user equipment served by the serving cell radio into one or more groups further comprises:
enabling intra-frequency measurement reporting for each user equipment served by the serving cell radio.

19. The apparatus of claim 17, wherein selecting a particular master user equipment for a particular group further comprises:
determining a data rate for each user equipment for the particular group based on at least one of:
evaluating a number of quality of service (QoS) class identifiers (QCIs) for each user equipment, wherein the number of QCIs for each user equipment is associated with the data rate for each user equipment; and
determining the data rate for each user equipment based on an assessment of one or more protocol layers of the serving cell radio.

20. The apparatus of claim 19, wherein selecting the particular master user equipment for the particular group further comprises:
comparing the data rate for each user equipment for the particular group to determine one or more candidate user equipment that can be selected as the particular master user equipment, wherein the one or more candidate user equipment have lower data rates in comparison to other user equipment of the particular group; and
selecting the master user equipment from the candidate user equipment, which has the lowest data rate and that is located at an approximate center of the particular group.

* * * * *